US011246158B2

(12) United States Patent
Yoshimura et al.

(10) Patent No.: US 11,246,158 B2
(45) Date of Patent: Feb. 8, 2022

(54) TERMINAL DEVICE, COMMUNICATION METHOD, AND COMMUNICATION SYSTEM

(71) Applicant: SHARP KABUSHIKI KAISHA, Sakai (JP)

(72) Inventors: Tomoki Yoshimura, Sakai (JP); Hiromichi Tomeba, Sakai (JP); Yasuhiro Hamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 16 days.

(21) Appl. No.: 16/572,259

(22) Filed: Sep. 16, 2019

(65) Prior Publication Data

US 2020/0015267 A1    Jan. 9, 2020

Related U.S. Application Data

(62) Division of application No. 15/567,247, filed as application No. PCT/JP2016/061981 on Apr. 14, 2016, now Pat. No. 10,440,741.

(30) Foreign Application Priority Data

Apr. 17, 2015 (JP) ................................ 2015-084603

(51) Int. Cl.
 *H04W 74/08* (2009.01)
 *H04W 74/00* (2009.01)
 (Continued)

(52) U.S. Cl.
 CPC ..... *H04W 74/008* (2013.01); *H04W 56/0015* (2013.01); *H04W 72/1278* (2013.01);
 (Continued)

(58) Field of Classification Search
 CPC ................ H04B 7/0452; H04W 48/16; H04W 56/0015; H04W 72/1278; H04W 74/006;
 (Continued)

(56) References Cited

U.S. PATENT DOCUMENTS 7,489,670 B2   2/2009  Shapira
9,392,561 B2   7/2016  Kang et al.
(Continued)

FOREIGN PATENT DOCUMENTS

JP    2015-511098 A    4/2015

OTHER PUBLICATIONS

Yongho Seok et al., Uplink Multi-User MIMO Protocol Design, IEEE 802.11-15/0331r0, Mar. 8, 2015.
(Continued)

*Primary Examiner* — Minh Trang T Nguyen
(74) *Attorney, Agent, or Firm* — ScienBiziP, P.C.

(57) ABSTRACT

A method that carries out uplink multiple access while reducing complexity in processing accompanying exchange of control information. A terminal device that performs uplink multiple access communication includes a reception unit that receives a frame including first uplink multiple access information, and a transmission unit that transmits a frame including second uplink multiple access information based on the frame including the first uplink multiple access information, and further, after standby of a predetermined period, initiates the uplink multiple access communication. The reception unit determines whether or not there has been reception of a frame including the second uplink multiple access information that another terminal device has transmitted during the predetermined period, and the transmission unit decides whether or not to initiate the uplink multiple access communication, based on whether or not there has been reception of a frame including the second uplink multiple access information that another terminal device has transmitted during the predetermined period.

6 Claims, 14 Drawing Sheets

(51) Int. Cl.
*H04W 56/00* (2009.01)
*H04W 76/10* (2018.01)
*H04W 72/12* (2009.01)
*H04W 84/12* (2009.01)
*H04B 7/0452* (2017.01)
*H04W 48/16* (2009.01)

(52) U.S. Cl.
CPC ..... *H04W 74/006* (2013.01); *H04W 74/0833* (2013.01); *H04W 76/10* (2018.02); *H04B 7/0452* (2013.01); *H04W 48/16* (2013.01); *H04W 84/12* (2013.01)

(58) Field of Classification Search
CPC ........... H04W 74/008; H04W 74/0833; H04W 76/10; H04W 84/12
See application file for complete search history.

(56) References Cited

U.S. PATENT DOCUMENTS

| | | |
|---|---|---|
| 2007/0147312 A1 | 6/2007 | Shapira |
| 2014/0355534 A1 | 12/2014 | Vermani et al. |
| 2015/0085836 A1 | 3/2015 | Kang et al. |
| 2016/0157266 A1* | 6/2016 | Wang .................. H04W 72/042 370/336 |

OTHER PUBLICATIONS

Non-Final Rejection dated Nov. 2, 2018 issued in U.S. Appl. No. 15/567,247.

\* cited by examiner

FIG. 8

| Group ID | STATIONS INCLUDED |
|---|---|
| 0 | UNUSED |
| 1 | STA2, STA3, STA4, STA5 |
| 2 | STA3, STA2, STA4, STA5 |
| ⋮ | ⋮ |
| 31 | STA6, STA2, STA4, STA8 |
| 32 | STA7, STA8, STA4, STA6 |
| 33 | STA2, STA3, STA8, STA5 |
| ⋮ | ⋮ |
| 62 | STA4, STA5, STA6, STA7 |
| 63 | UNUSED | ns # TERMINAL DEVICE, COMMUNICATION METHOD, AND COMMUNICATION SYSTEM

The present application is a divisional application of U.S. patent application Ser. No. 15/567,247, filed on Oct. 17, 2017, which is the U.S. national phase of International Application No. PCT/JP2016/061981 filed Apr. 14, 2016, which designated the U.S. and claims priority to Japanese Patent Application No. 2015-084603 filed in Japan on Apr. 17, 2015. The entire disclosure of such parent application is incorporated herein by reference.

TECHNICAL FIELD

The present invention relates to a terminal device, a communication method, and a communication system.

BACKGROUND ART

The IEEE (The Institute of Electrical and Electronics Engineers Inc.) has set forth IEEE 802.11ac, which realizes even higher speeds than IEEE 802.11 that is a wireless LAN (Local Area Network) standard. The IEEE currently has started work on standardization of IEEE 802.11ax as a successor standard for IEEE 802.11ac. Improved throughput per user in an environment where wireless LAN devices are overcrowded is being studied in standardization of IEEE 802.11ax as well, to handle the rapid increase of wireless LAN devices.

A wireless LAN system is a system where each wireless LAN device secures its own resources in an autonomous decentralized manner (autonomous decentralized system). An autonomous decentralized system is a system in which temporal synchronization among wireless LAN devices, and exchange of complicated control information, are not required. Accordingly, a wireless network can be configured using wireless LAN devices that have a relatively simple configuration. Autonomous decentralized systems are well-suited for unlicensed band, due to the ease of configuring wireless networks.

Usage situations of wireless LAN systems have become markedly diversified due to the rapid spread thereof in recent years. For example, situations such as a wireless carrier using a wireless LAN system for offloading wireless mobile communication traffic, providing public wireless LANs primarily targeting foreign tourists, and so forth, have already been realized, with wireless LAN base stations (AP: Access Point) being installed in train stations, large-scale commercial facilities, and so forth. Thus, wireless LANs have been actively installed in locations where people congregate, with Internet services being actively provided.

The standardization of IEEE 802.11ax aims to improve throughput in environments where wireless LAN devices are overcrowded, viewed against the background of diversity in usage situations of wireless LAN, and technology for introduction thereof is being studied.

One technology being studied for standardization of IEEE 802.11ax is uplink multiple access technology. Uplink multiple access technology is technology where multiple LAN device perform transmission collaboratively, temporal synchronization among wireless LAN devices and exchange of control information being required of the wireless LAN devices. Accordingly, detailed discussion is being held in standardization of IEEE 802.11ax, with regard to temporal synchronization of wireless LAN devices and procedures for exchange of control information.

NPL 1 proposes procedures for uplink MU-MIMO. According to NPL 1, a wireless LAN base station transmits a frame that triggers initiation of uplink MU-MIMO (trigger frame). An arrangement is used where a wireless LAN device that has received the trigger frame initiates transfer of data at a predetermined point in time, if participation in the uplink MU-MIMO has been instructed by the wireless LAN base station, thereby easily enabling temporal synchronization among wireless LAN devices.

CITATION LIST

Non Patent Literature

NPL 1: IEEE 802.11-15/0331r0 Uplink Multi-User MIMO Protocol Design

SUMMARY OF INVENTION

Technical Problem

However, in a case of performing uplink MU-MIMO using the procedures described in NPL 1, the wireless LAN base station needs to comprehend information regarding data traffic of each wireless LAN device. This means that there is a need to notify information regarding data traffic of each wireless LAN device to the wireless LAN base station as control information, which complicates the wireless network.

The present invention has been made in light of the above, and it is an object thereof to disclose a method of realizing uplink multiple access while reducing complexity of wireless networks due to exchange of control information.

Solution to Problem

The terminal device, communication method, and communication system, according to the present invention, for solving the above-described problem, are as follows.

(1) That is to say, the terminal device according to the present invention is a terminal device that performs uplink multiple access communication, including a reception unit that receives a frame including first uplink multiple access information, and a transmission unit that transmits a frame including second uplink multiple access information based on the frame including the first uplink multiple access information, and further, after standby of a predetermined period, initiates the uplink multiple access communication.

(2) Also, the terminal device according to the present invention is the terminal device according to the above (1) wherein the reception unit determines whether or not there has been reception of a frame including the second uplink multiple access information that another terminal device has transmitted during the predetermined period, and wherein the transmission unit decides whether or not to initiate the uplink multiple access communication, based on whether or not there has been reception of a frame including the second uplink multiple access information that another terminal device has transmitted during the predetermined period.

(3) Also, the terminal device according to the present invention is the terminal device according to the above (2) wherein the reception unit receives a frame including the second uplink multiple access information that the other terminal device has transmitted, and wherein the transmission unit transmits a frame including the second uplink multiple access information, based on the frame including the second uplink multiple access information that the other terminal device has transmitted.

(4) Also, the terminal device according to the present invention is the terminal device according to either of the above (2) or the above (3) wherein the transmission unit includes information relating to the predetermined period in the frame including the second uplink multiple access information.

(5) Also, the terminal device according to the present invention is the terminal device according to either of the above (2) or the above (3) wherein the second uplink multiple access information includes information relating to a transmission timing of a frame by the terminal device including the second uplink multiple access information, and wherein the terminal device comprises a resource control unit that decides a transmission timing of a frame including the second uplink multiple access information, based on information relating to the transmission timing of the frame.

(6) Also, the terminal device according to the present invention is the terminal device according to either of the above (2) or the above (3) wherein the second uplink multiple access information is information indicating a set of terminal devices other than the terminal device.

(7) Also, the terminal device according to the present invention is the terminal device according to any one of the above (1) through the above (6) wherein the terminal device secures wireless resources to be used for transmission of a frame including the second uplink multiple access information, based on random back-off processing.

(8) Also, the terminal device according to the present invention is a terminal device that performs uplink multiple access communication includes a transmission unit that transmits a frame including first uplink multiple access information, and a reception unit that determines whether or not there has been reception of a frame including second uplink multiple access information that another terminal device has transmitted during a predetermined period. The transmission unit decides whether or not to initiate the uplink multiple access communication, based on whether or not there has been reception of a frame including the second uplink multiple access information that another terminal device has transmitted during the predetermined period.

(9) Also, a communication method of a terminal device according to the present invention is a communication method of the terminal device including at least a step of receiving a frame including first uplink multiple access information, a step of transmitting a frame including second uplink multiple access information based on the frame including the first uplink multiple access information, and a step of initiating the uplink multiple access communication after standby of a predetermined period.

(10) Also, a communication method of a terminal device according to the present invention is a communication method including at least a step of transmitting a frame including first uplink multiple access information, a step of determining whether or not there has been reception of a frame including second uplink multiple access information that another terminal device has transmitted during a predetermined period, and a step of determining whether or not to initiate the uplink multiple access communication, based on whether or not there has been reception of a frame including the second uplink multiple access information that another terminal device has transmitted during the predetermined period.

(11) Also, a communication system according to the present invention is a communication system including a first terminal device and a second terminal device. The second terminal device includes a transmission unit that transmits a frame including first uplink multiple access information, and a reception unit that determines whether or not there has been reception of a frame including second uplink multiple access information that another terminal device has transmitted during a predetermined period. The second terminal device includes a reception unit that receives a frame including first uplink multiple access information, and a transmission unit that transmits a frame including second uplink multiple access information based on the frame including the first uplink multiple access information, and further, after standby of a predetermined period, initiates the uplink multiple access communication.

Advantageous Effects of Invention

According to the present invention, terminal devices and a base station device can form a suitable wireless network.

BRIEF DESCRIPTION OF DRAWINGS

FIG. 8 is a diagram illustrating an example of GID configuration according to the present invention.

DESCRIPTION OF EMBODIMENTS

Figure 1:
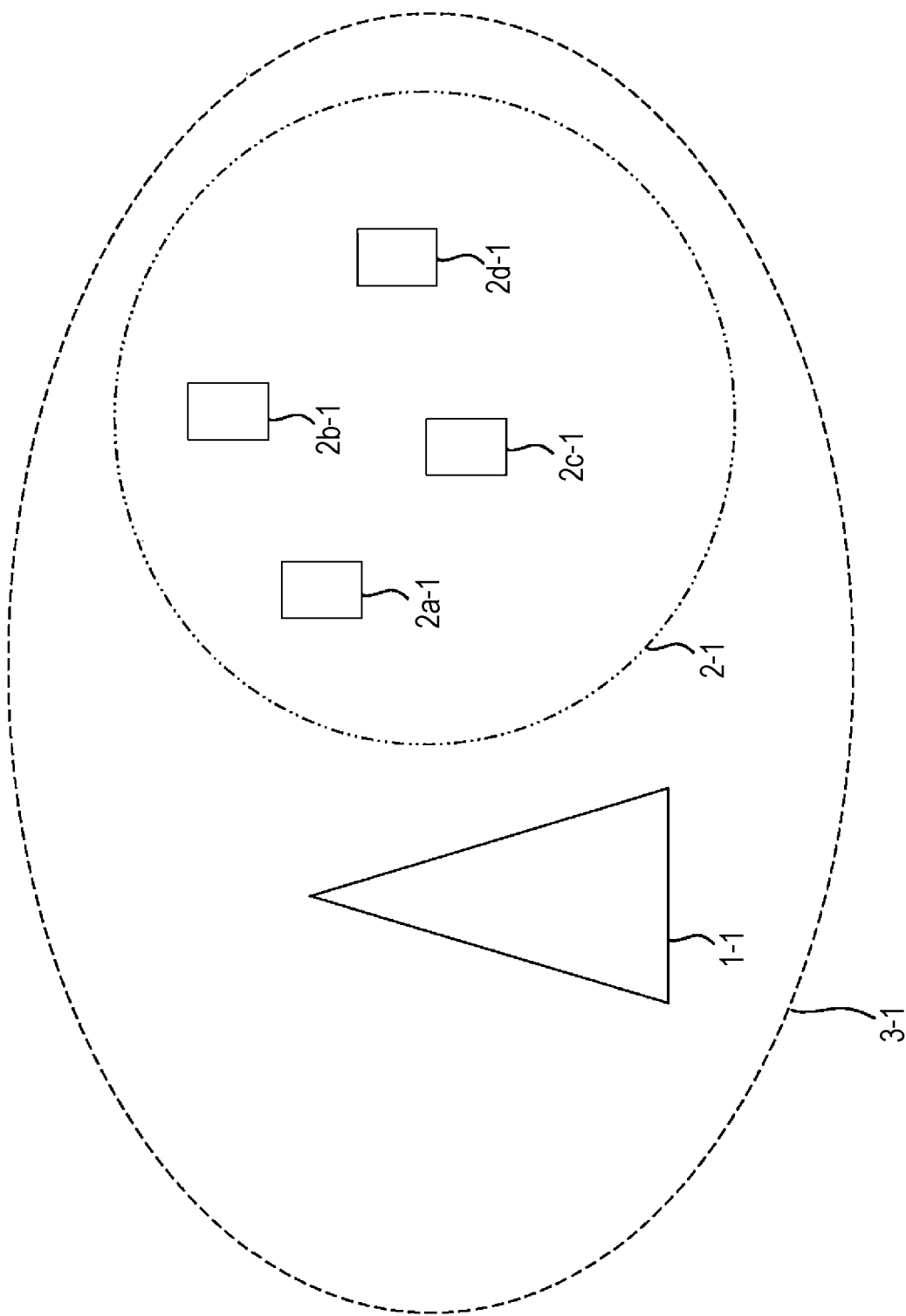
FIG. 1 is a diagram illustrating an example of the configuration of a wireless communication system according to the present invention.

A communication system according to the present embodiment includes a wireless transmission device (access point, base station device: Access point, base station device), and multiple wireless reception devices (station, terminal device: station terminal device). A network configured of the base station device and terminal devices is referred to as a basic service set (BSS: Basic service set, management range). The base station device and terminal devices are also collectively referred to as wireless devices.

The base station device and terminal devices within the BSS each perform communication based on CSMA/CA (Carrier sense multiple access with collision avoidance). Although the present embodiment deals with an infrastructure mode where a base station device communicates with multiple terminal device, the method according to the present embodiment is also executable in an ad hoc mode where terminal devices directly communicate with each other. In ad hoc mode, a terminal device serves as the base station device and forms a BSS. A BSS in ad hoc mode is also referred to as an IBSS (Independent Basic Service Set). In the following, a terminal device that forms an IBSS in ad hoc mode will be deemed as being a base station device.

In an IEEE 802.11 system, each device is capable of transmitting multiple types of transmission frames having a common frame format. Transmission frames are each defined by physical (Physical: PHY) layer, media access control (Medium access control: MAC) layer, and logical link control (LLC: Logical Link Control) layer.

A PHY layer transmission frame is referred to as a physical protocol data unit (PPDU: PHY protocol data unit, physical layer frame). A PPDU is configured of a physical layer header (PHY header) including header information and the like for performing signal processing at the physical layer, a physical service data unit (PSDU: PHY service data unit, MAC layer frame) that is a data unit processed at the physical layer, and so forth. A PSDU can be configured of an aggregated MPDU (A-MPDU: Aggregated MPDU) which is an aggregation of multiple MAC protocol data units (MPDU: MAC protocol data unit) that are retransmission increments in the wireless zone.

The PHY header includes reference signals such as short training field (STF: Short training field) used for detection, synchronization, and so forth of signals, long training field (LTF: Long training field) used for acquiring channel information for data demodulation, and so forth, and control singals such as signal (Signal: SIG) containing control information for data demodulation, and so forth. STF is also classified into legacy STF (L-STF: Legacy-STF), high throughput STF (HT-STF: High throughput-STF), very high throughput STF (VHT-STF: Very high throughput-STF), or high efficiency STF (HE-STF: High efficiency-STF), or the like, in accordance with the corresponding standard, and in the same way LTF and SIG are also classified into L-LTF, HT-LTF, VHT-LTF, HE-LTF, L-SIG, HT-SIG, VHT-SIG, and HE-SIG. VHT-SIG is further classified into VHT-SIG-A and VHT-SIG-B.

Further, the PHY header can include information for identifying the transmission source BSS of this transmission frame (hereinafter also referred to as BSS identification information). Information identifying a BSS may be an SSID (Service Set Identifier) of this BSS, for example, or a MAC address of the base station device of this BSS. Further, information identifying a BSS may be a value unique to the BSS (e.g., BSS Color or the like), other than SSID or MAC address.

PPDUs are modulated in accordance with the corresponding standard. For example, PPDUs are modulated into orthogonal frequency division multiplexing (OFDM: Orthogonal frequency division multiplexing) signals in the IEEE 802.11n standard.

An MPDU is configured of a MAC layer header (MAC header) including header information for performing signal processing at the MAC layer and so forth, a MAC service data unit (MSDU: MAC service data unit) that is a data unit process at the MAC layer, or a frame body, and a frame inspection unit (Frame check sequence: FCS) for checking whether there are no errors in the frame. Also, multiple MSDUs can be aggregated as an aggregated MSDU (A-MSDU: Aggregated MSDU).

Frame types of MAC layer transmission frames are generally classified in to the three of management frames for managing inter-device connection state and so forth, control frames for managing inter-device communication state, and data frames containing the actual communication data, each being further classified into multiple types of sub-frames. Control frames include reception complete notification (Ack: Acknowledge) frames, transmission request (RTS: Request to send) frames, reception preparation complete (CTS: Clear to send) frames, and so forth. Management frames include beacon (Beacon) frames, probe request (Probe request) frames, probe response (Probe response) frames, authentication (Authentication) frames, association request (Association request) frames, association response (Association response) frames, and so forth. Data frames include data (Data) frames, polling (CF-poll) frames, and so forth. The devices can comprehend the frame type and sub-frame type received, by reading the content of the frame control field contained in the MAC header.

Note that Block Ack may be included in Ack. Block Ack can perform reception complete notification regarding multiple MPDUs.

A beacon frame contains a cycle at which a beacon is transmitted (Beacon interval) and a field (Field) to list an SSID. A base station device can periodically notify a beacon frame within the BSS, and terminal devices can comprehend the base station device in the periphery of the terminal devices by receiving the beacon frame. Terminal devices comprehending a base station device based on a beacon frame notified by the base station device is referred to as passive scanning (Passive scanning). On the other hand, a terminal device searching for a base station by annunciation of a probe request frame within the BSS is referred to as active scanning (Active scanning). A base station device can transmit a probe response frame as a response to the probe request frame, the content described on the probe response frame being equivalent to that of a beacon frame.

After recognition of the base station device, the terminal device performs connection processing as to the base station device. Connection processing is classified into authentication (Authentication) procedures and association (Association) procedures. The terminal device transmits an authentication frame (authentication request) to the base station device regarding which connection is desired. Upon receiving the authentication frame, the base station device transmits an authentication frame (authentication response) including a status code, indicating whether authentication of the terminal device is permissible and so forth, to the terminal device. The terminal device can determine whether or not it has been permitted authentication by the base station device, by reading the status code described in authentication frame. Note that the base station device and the terminal device can exchange authentication frames multiple times.

Following authentication processing, the terminal device transmits an association request frame to the base station device to perform association procedures. Upon receiving the association request frame, the base station device determines whether or not to permit association of the terminal device, and transmits an association response frame to make notification to that effect. In addition to a status code indicating whether or not association processing is permissible, an association identification number (AID: Association identifier) of identifying the terminal device is described in the association response frame. The base station device can manage multiple terminal devices by setting different AIDs for each of the terminal devices to which association permissions have been issued.

After the association processing has been performed, the base station device and terminal device perform actual data transmission. Distributed control mechanism (DCF; Distributed Coordination Function) and centralized control mechanism (PCF: Point Coordination Function), and mechanisms where these have been extended (extended distributed channel access (EDCA: Enhanced districted channel access), hybrid control mechanism (HCF: Hybrid coordination function), etc.), are described in the IEEE 802.11 system. A case where a base station device transmits signals to a terminal device by DCF will be exemplarily described below.

In DCF, the base station device and the terminal device perform carrier sensing (CS: Carrier sense) in which the usage state of wireless channels in their periphery is confirmed, before communication. For example, in a case where the base station device that is the transmitting station receives a signal that is higher than a predetermined clear channel assessment level (CCA level: Clear channel assessment level) on this wireless channel, transmission of a transmission frame over this wireless channel is delayed. Hereinafter, a state where a signal of CCA level or higher is detected will be referred to as a busy (Busy) state, and a state where a signal of CCA level or higher is not detected as an idle (Idle) state of the wireless channel. CS performed based on power of signals each device has actually received (reception power level) in this way is referred to as physical carrier sensing (physical CS). The CCA level is also referred to as carrier sense level (CS level) or CCA threshold (CCA threshold: CCAT). In a case of detecting signals at the CCA level or higher, the base station device and terminal device start operations of at least demodulating PHY layer signals.

The base station device performs carrier sensing for a frame interval (IFS: Inter frame space) corresponding to the type of transmission frame being transmitted, and determines whether the wireless channel is in a busy state or idle state. The period over which the base station device performs carrier sensing differs depending on the frame type and sub-frame type of the transmission frame that the base station device is going to transmit. Multiple IFSs having different periods are defined in the IEEE 802.11 system, including a short frame interval (SIFS: Short IFS) used for transmission frames to which the highest priority has been given, a poling frame interval (PCF IFS: PIFS) used for transmission frames of which the priority is relatively high, a districted control frame interval DCF IFS: DIFS) used for transmission frames of which the priority is the lowest, and so forth. In a case of the base station device transmitting a data frame by DCF, the base station device uses DIFS.

After standing by for a DIFS, the base station device further stands by for a random back-off time, to prevent frame collision. A random back-off time called contention window (CW: Contention window) is used in the IEEE 802.11 system. CSMA/Ca assumes that a transmission frame transmitted from a certain transmitting station will be received by a receiving station in a state with no interference from another transmitting station. Accordingly, in a case where transmitting stations transmit transmission frames at the same timing, the frames collide, and the receiving station cannot receive correctly. Accordingly, each of the transmitting stations standing by for a randomly-set amount of time before initiating transmission avoids frame collision. Upon determining by carrier sensing that a wireless channel is in an idle state, the base station device starts a CW countdown, and can acquire a transmission right for the first time once the CW is 0, and transmit a transmission frame to the terminal device. In a case where the base station device determines by carrier sensing that the wireless channel is in a busy state during the CW countdown, the base station device stops the CW countdown. In a case where the state of the wireless channel becomes idle, the base station device resumes the remaining CW countdown following the preceding IFS.

The terminal device that is a receiving device receives the transmission frame, reads the PHY header of the transmission frame, and demodulates the received transmission frame. The terminal device can recognize whether or not the transmission frame is addressed to itself, by reading the MAC header of the demodulated signals. Note that the terminal device can also recognize the addressee of the transmission frame based on information described in the PHY header (e.g., group identification number (GID: Group identifier, Group ID) described in VHT-SIG-A).

In a case of determining that the received transmission frame has been addressed to itself, and successfully demodulating the transmission frame without error, the terminal device must transmit an ACK frame, indicating that the frame was correctly received, to the base station device that is the transmitting station. An ACK frame is one of transmission frames with the highest priority, transmitted with only a SIFS period standby (no time taken for random back-off time). The series of communication ends with the base station device receiving the ACK frame transmitted from the terminal device. In a case where the terminal device is not able to receive the frame correctly, the terminal device does not transmit an ACK. Accordingly, in a case where no ACK frame is received from the receiving station over a predetermined time (SIFS+ACK frame length) after having transmitted the frame, the base station device deems the communication to have failed, and ends the communication. In this way, ending of one time of communication in the IEEE 802.11 system (also referred to as a burst) is always determined by whether or not an ACK frame has been received, excluding cases of transmission of an annunciation signal such as a beacon frame or the like, or special cases such as cases of using fragmentation where transmission data is divided.

In a case of determining that the received transmission frame is not addressed to itself, the terminal device sets a network allocation vector (NAV: Network allocation vector), based on the length (Length) of the transmission frame described in the PHY header or the like. The terminal device does not attempt communication for the period set in the NAV. That is to say, during the period set to the NAV, the terminal device performs operations the same as a case of having determined by physical CS that the wireless channel is in a busy state, and accordingly communication control by the NAV is also referred to as virtual carrier sensing (virtual CS). In addition to cases of being set based on information described in the PHY header, the NAV is also set by a transmission request (RTS: Request to send) frame introduced to resolve a hidden node problem, and reception preparation complete (CTS: Clear to send) frames as well.

While each device performs carrier sensing and autonomously acquires transmission right in DCF, a control station called a point coordinator (PC: Point coordinator) controls the transmission rights of the devices within the BSS in PCF. Generally, the base station device serves as the PC, and the terminal devices within the BSS acquire transmission right.

A non-contention period (CFP: Contention free period) and a contention period (CP: Contention period) are included in a communication period by PCF. The above-described communication based on DCF is performed during the CP, and it is during the CFP that the PC controls the transmission right. The base station device serving as the PC performs annunciation within the BSS of a beacon frame in which is described the period of the CFP (CFP Max duration) and so forth, prior to communication by PCF. Note that PIFS is used for transmission of the beacon frame annunciated at the time of initiating PCF transmission, and transmission is performed without waiting for the CW. Terminal devices that receives the beacon frame set the CFP period described in the beacon frame to the NAV. Thereafter, the terminal devices can only acquire a transmission right in a case of receiving a signal signaling transmission right acquisition (e.g., a data frame including a CF-poll) transmitted by the PC, until the NAV elapses, or a signal annunciating the end of the CFP within the BSS ((e.g., a data frame including a CF-end) is received. Packet collisions do not occur within the same BSS during the CFP period, so the terminal devices do not use the random back-off time used in DCF.

Hereinafter, the base station device and terminal devices are also collectively referred to as wireless devices. Also, information exchanged at the time of a certain wireless device communicating with another wireless device is also referred to as data (data).

The wireless devices support multiple access (MA: Multiple Access) in uplink (UL: Uplink). Uplink multiple access (UL-MU) includes uplink spatial division multiple access (UL-SDMA: Uplink-Spatial Division Multiple Access, UL-MU-MIMO: Uplink Multi-User-Multiple Input Multiple Output), and uplink frequency division multiple access (UL-FDMA: Uplink-Frequency Division Multiple Access). Hereinafter, a wireless device that initiates UL-MU transmission (transmits a frame notifying a UL-MU transmission initiation period, transmits a poll frame for UL-MU transmission, first transmits a frame including control information for UL-MU transmission) is also referred to as an initiator (Initiator). A wireless device that transmits a responding frame (e.g., transmits a frame for participating in UL-MU transmission, transmits a frame notifying UL-MU transmission function information) as to the frame that the Initiator first transmits to initiate UL-MU transmission (also referred to as a UL-MU poll frame) is also referred to as a responder (Responder). A wireless device that further transmits a responding frame as to a response frame transmitted by the Responder is also included in the Responder. Note that the Initiator is also referred to as a first terminal device, and the Responder is also referred to as a second terminal device.

Hereinafter, a terminal device may be a terminal device other than a base station device (e.g., a Non-AP STA), or may be a terminal device including a base station device and terminal devices (e.g., a STA). That is to say, in the following description, a base station device can perform operations described as those of a terminal device.

First Embodiment

FIG. 1 is a diagram illustrating an example of the configuration of a wireless communication system according to the present embodiment. A base station device 1-1 and terminal stations 2a-1, 2b-1, 2c-1, and 2d-1 (hereinafter also collectively referred to as terminal devices 2-1) make up a wireless communication system 3-1. The wireless communication system may also be referred to as a BSS (Basic Service Set). The base station device 1-1 and terminal devices 2-1 may also be collectively referred to as wireless devices 0-1.

Hereinafter, UL-MU-MIMO will be assumed as one example, but the present embodiment is applicable to common UL-MU transmission. For example, the present embodiment is applicable to UL-OFDMA (Uplink-Orthogonal Frequency Division Multiple Access) as well.

Figure 2:
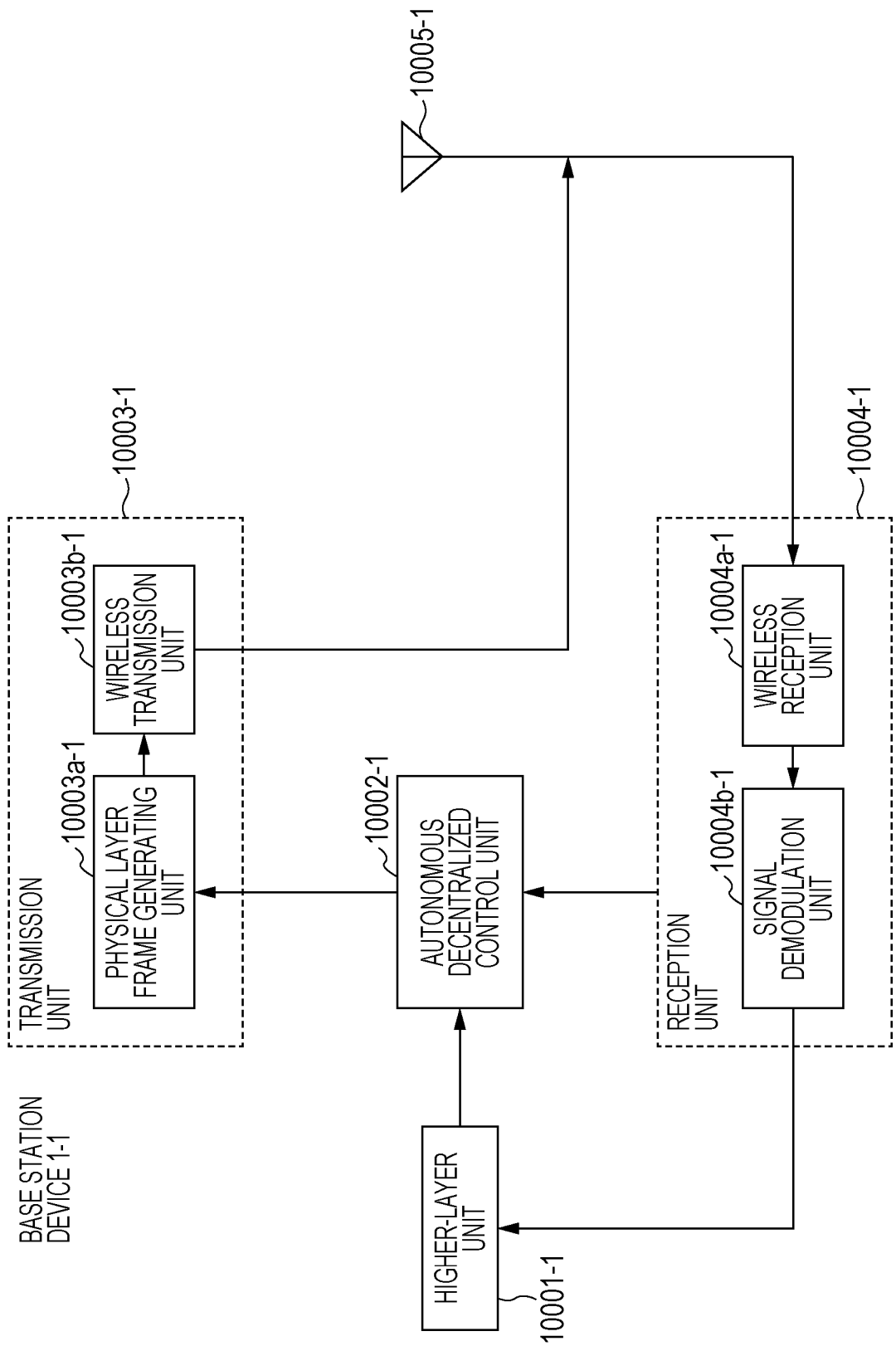
FIG. 2 is a diagram illustrating an example of the device configuration of a base station device according to the present invention.

FIG. 2 is a diagram illustrating an example of the device configuration of the base station device 1-1. The base station device 1-1 has a configuration including a higher-layer unit 10001-1, an autonomous decentralized control unit 10002-1, a transmission unit 10003-1, a reception unit 10004-1, and an antenna unit 10005-1.

The higher-layer unit 10001-1 is connected to another network, and can notify the autonomous decentralized control unit 10002-1 of information relating to traffic. Information relating to traffic may be information addressed to a device, for example, or may be control information included in a management frame or a control frame.

Figure 3:
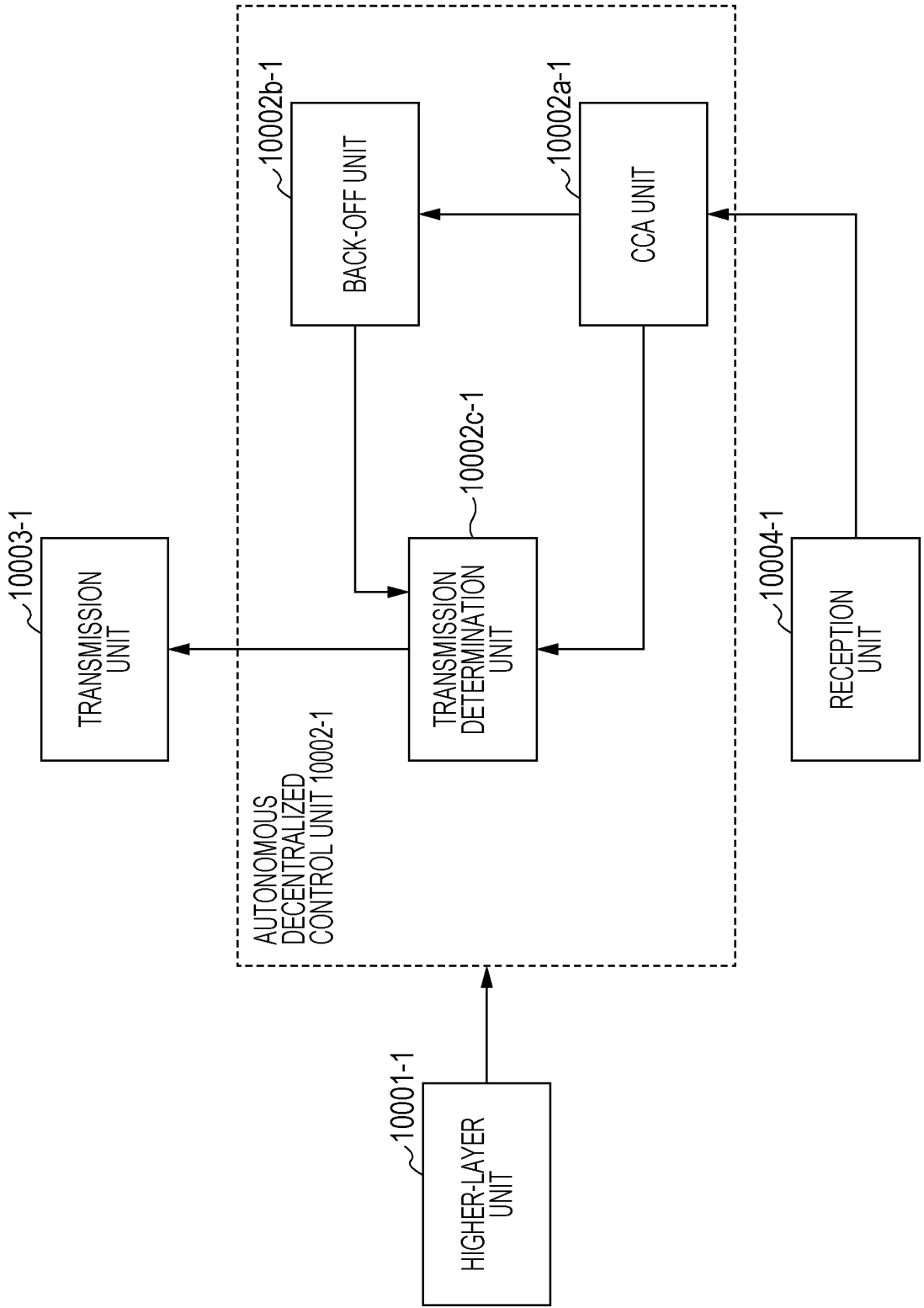
FIG. 3 is a diagram illustrating an example of the configuration of an autonomous decentralized control unit according to the present invention.

FIG. 3 is a diagram illustrating an example of the device configuration of the autonomous decentralized control unit 10002-1. The autonomous decentralized control unit 10002-1 is a configuration including a CCA unit 10002a-1, a back-off unit 10002b-1, and a transmission determination unit 10002c-1.

The CCA unit 10002a-1 can perform state determination of a wireless resource (including determination of whether busy or idle), using one or both of information relating to reception signal power of the wireless resource and information relating to reception signals (including information after decoding), notified from the reception unit 10004-1. The CCA unit 10002a-1 can notify the back-off unit 10002b-1 and transmission determination unit 10002c-1 of state determination information regarding this wireless resource.

The back-off unit 10002b-1 has a function of performing back-off processing using state determination information of the wireless resource. The back-off unit 10002b-1 can generate a CW, and further can perform countdown of the CW. For example, in a case where the state determination information of the wireless resource indicates idle, countdown of the CW can be performed, and in a case where the state determination information of the wireless resource indicates busy, countdown of the CW can be stopped. The back-off unit 10002b-1 can notify the transmission determination unit 10002c-1 of the value of the CW.

The transmission determination unit 10002c-1 performs transmission determination using one or both of the state determination information of the wireless resource and the value of the CW. For example, if the state determination information of the wireless resource indicates idle and the value of the CW is 0, the transmission unit 10003-1 can be notified of the transmission determination information. Alternatively, if the state determination information of the wireless resource indicates idle, the transmission unit 10003-1 can be notified of the transmission determination information.

The transmission unit 10003-1 is a configuration including a physical layer frame generating unit 10003a-1 and a wireless transmission unit 10003b-1. The physical layer frame generating unit 10003a-1 has a function of generating physical layer frames based on transmission determination information notified from the transmission determination unit 10002c-1. The physical layer frame generating unit 10003a-1 subjects physical layer frames to error-correction encoding, modulation, prerecording filter multiplication, and so forth. The physical layer frame generating unit 10003a-1 notifies the wireless transmission unit 10003b-1 of the generated physical layer frames.

The wireless transmission unit 10003b-1 converts the physical layer frames generated by the physical layer frame generating unit 10003a-1 into radio frequency (RF: Radio Frequency) band signals, thereby generating radio frequency signals. The processing performed by the wireless transmission unit 10003b-1 includes digital-to-analog conversion, filtering, frequency conversion from baseband band to RF band, and so forth.

The reception unit 10004-1 is a configuration including a wireless reception unit 10004a-1 and a signal demodulation unit 10004b-1. The reception unit 10004-1 generates information relating to reception signal power from RF band signals that the antenna unit 10005-1 receives. The reception unit 10004-1 can notify the CCA unit 10002a-1 of information relating to reception signal power and information relating to reception signals.

The wireless reception unit 10004a-1 has a function of converting the RF band signals received by the antenna unit 10005-1 into baseband signals, and generating physical layer signals (e.g., physical layer frames). The processing performed by the wireless reception unit 10004a-1 includes frequency conversion processing from RF band to baseband band, filtering, and analog-to-digital conversion.

The signal demodulation unit 10004b-1 has a function of demodulating physical layer signals generated by the wireless reception unit 10004a-1. The processing performed by the signal demodulation unit 10004b-1 includes channel equalization, de-mapping, error-correction decoding, and so forth. The signal demodulation unit 10004b-1 can extract information included in the physical layer header, information included in the MAC header, and information included in the transmission frame, for example from the physical layer signals. The signal demodulation unit 10004b-1 can notify the higher-layer unit 10001-1 of the extracted information. Note that the signal demodulation unit 100010b can extract any or all of the information included in the physical layer header, information included in the MAC header, and information included in the transmission frame.

The antenna unit 10005-1 has a function of transmitting radio frequency signals generated by the wireless transmission unit 10003b-1 into the wireless space toward the wireless devices 0-1. The antenna unit 10005-1 also has a function of receiving radio frequency signals transmitted from the wireless devices 0-1.

The device configuration of the terminal device 2-1 is the same as that of the base station device 1-1, so description will be omitted.

Figure 4:
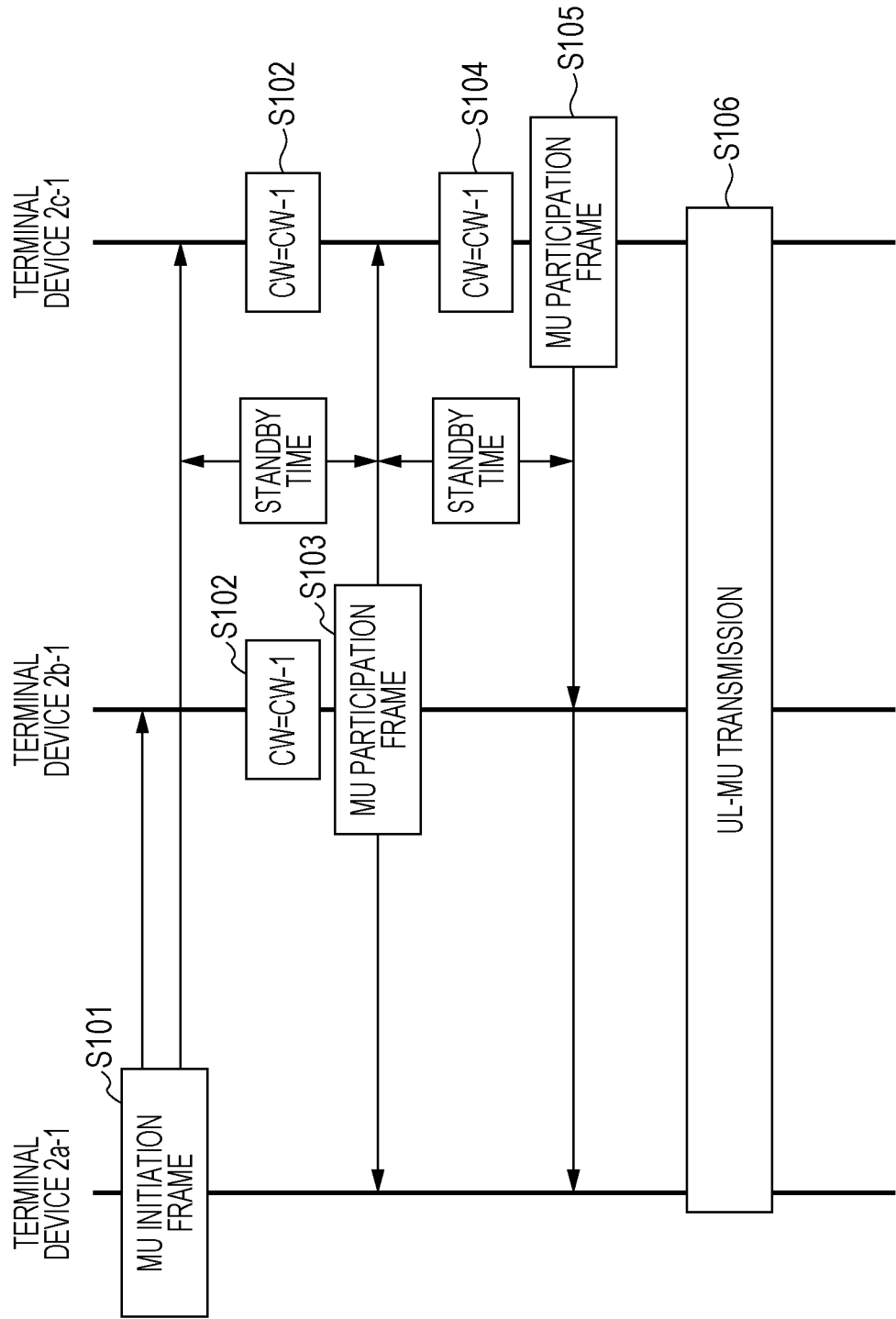
FIG. 4 is a sequence chart illustrating an example of procedures for UL-MU transmission according to the present invention.

FIG. 4 is a sequence chart illustrating an example of procedures for UL-MU transmission according to the first embodiment. Note that the example illustrated in FIG. 4 is applicable to any MU upper limit number. An MU upper limit number is the upper limit value of the number of terminal devices 2-1 that the base station device 1-1 can receive at the same time in a case where multiple terminal devices 2-1 transmit at the same time by UL-MU transmission. For example, in UL-MU-MIMO, the MU upper limit number preferably is equal to or less than the number of antenna elements of the base station device 1-1. In UL-OFDMA, the MU upper limit number can be decided based on the number of divisions of the frequency band (Granularity: granularity). Note that in a case of applying non-orthogonal access (a method of multiplexing multiple terminal devices on the same wireless resource), this does not hold regarding the MU upper limit number, and the value may be greater than the number of antenna elements even in the case of UL-MU-MIMO. The MU upper limit number is also referred to as maximum number of multiple users, maximum number of simultaneously transmitting terminals, number of permissible multiple users, number of permissible multiple transmitting terminals, and so forth.

In the example illustrated in FIG. 4, terminal device 2a-1 has initiated UL-MU transmission procedures. The terminal device 2a-1 transmits an MU initiation frame to the terminal device 2b-1 and terminal device 2c-1 (step S101). The MU initiation frame preferably includes a transmitting source address (the address of the terminal device 2a-1 in the example illustrated in FIG. 4), and information relating to an MU participation frame transmission time limit. The base station device 1-1 and terminal device 2-1 can transmit the MU initiation frame. The base station device 1-1 and terminal device 2-1 can transmit the MU participation frame. The transmitter of the MU initiation frame is also referred to as the Initiator, and the transmitter of the MU participation frame is also referred to as the Responder. Details of the MU initiation frame configuration will be described later.

Next, the terminal device 2b-1 and terminal device 2c-1 that have received the MU initiation frame perform CW countdown (step S102). The terminal device which has reached CW=0 within the MU participation frame transmission time limit as a result of the CW countdown (the terminal device 2b-1 in the example illustrated in FIG. 4) transmits an MU participation frame to the terminal device 2a-1 and terminal device 2c-1 (step S103). The configuration of the MU participation frame, and details of the MU participation frame transmission time limit, will be described later.

The terminal device 2c-1 that has received the MU participation frame then performs CW countdown (step S104). The terminal device which has reached CW=0 within the MU participation frame transmission time limit as a result of the CW countdown (the terminal device 2c-1 in the example illustrated in FIG. 4) transmits an MU participation frame to the terminal device 2a-1 and terminal device 2b-1 (step S105).

The terminal device 2a-1 and terminal device 2b-1 that have received the MU participation frame, and the terminal device 2c-1 that has transmitted the MU participation frame last, simultaneously initiate UL-MU transmission after standing by for a predetermined period (step S106).

The terminal device 2-1 can initiate UL-MU transmission in a suitable manner by the procedures of steps S101 through S106.

Figure 5:
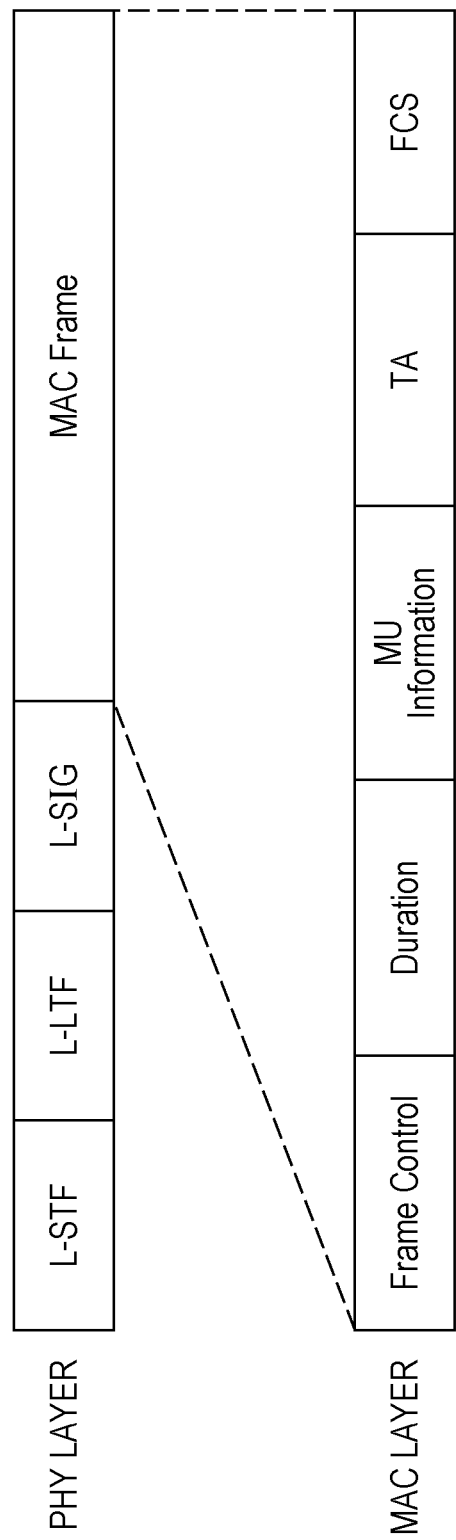
FIG. 5 is a diagram illustrating an example of the configuration of an MU initiation frame according to the present invention.

FIG. 5 is a diagram illustrating an example of the configuration of an MU initiation frame. The PHY layer frame has a configuration including L-STF, L-LTF, L-SIG and a MAC Frame, and the MAC Frame has a configuration including a Frame Control field, a Duration field, an MU Information field, a TA (Transmitter Address) field, and a FCS field. The Frame Control field is a field including information relating to frame type and so forth, and the Duration field is a field including information relating to NAV settings (information relating to the length of a transmission burst containing a reception complete notification). That TA field is a field including information relating to the address of the transmission source.

The MU Information field is a field including MU Information. MU Information can include information used in the UL-MU transmission according to the present embodiment. For example, MU Information can contain any or all of information relating to the MU participation frame transmission time limit, information relating to UL-MU transmission initiation timing, information relating to a CW generation method, and information relating to a countdown method, information relating to the number of MU participation frames capable of participation, information relating to an index of an MU participation frame, information indicating information identifying a group of terminal devices 2-1 (sub-group information), information relating to an LTF generation method, and information of an LTF transmission method.

Note that the configuration of an MU initiation frame is not restricted to the example illustrated in FIG. 5, and that any configuration may be used as long as it is a frame that triggers UL-MU transmission. Further, a frame having a configuration equivalent to RTS or CTS can be used as an MU initiation frame, to protect terminal devices that do not have functions to receive MU initiation frames (hereinafter also referred to as legacy terminal devices). The configuration of an MU frame may be the same as the configuration of RTS or CTS, with only part of information in the fields being different, as in the example illustrated in FIG. 5, so as to have a frame configuration receivable by legacy terminal devices.

An MU initiation frame can include information relating to the upper limit number of terminal devices participating in UL-MU transmission (MU upper limit number information), based on UL-MU transmission function information of the BSS 3-1. The base station device 1-1 can notify the terminal devices 2-1 information of whether or not the BSS 3-1 has UL-MU transmission functions, information of whether or not the BSS 3-1 has functions of transmitting and receiving MU initiation frames, information of whether or not the BSS 3-1 has functions of transmitting and receiving MU participation frames, information relating to permission of UL-MU transmission, information indicating transmission permission of MU initiation frames, information indicating transmission permission of MU participation frames, and information relating to the upper limit of the number of participating terminal devices in UL-MU transmission, as function information of the BSS 3-1. An MU initiation frame transmitted by the terminal devices 2-1 preferably includes MU upper limit number information that indicates a value equal to or smaller than information relating to the upper limit of the number of participating terminal devices in UL-MU transmission. Each of the terminal devices 2-1 can use multiple wireless resources. Now, if the MU upper limit number information is NMU, the number of wireless resources that a terminal device 2-x uses in a certain UL-MU transmission is Nx, and a group of terminal devices 2-1 participating in the UL-MU transmission is Y, Nmu≥ΣxYNx is preferable.

The terminal devices 2-1 use information relating to the MU participation frame transmission time limit for determining whether or not an MU participation frame can be transmitted. For example, even in a case of having received an MU initiation frame, the back-off unit 10002b-1 continues the CW countdown, and transmits an MU participation frame toward the terminal devices 2-1 at the point that CW=0 is reached. Note that the timing of transmitting the MU participation frame is not restricted to the point that CW=0 is reached, and may be a point at which a predetermined amount of time has elapsed after having received an MU initiation frame (e.g., IFS or the like), or a point at which a predetermined amount of time has elapsed after the point that CW=0 is reached (e.g., IFS or the like). The back-off unit 10002b-1 may also resume the CW countdown at a point at which a predetermined amount of time has elapsed after having received an MU initiation frame (e.g., IFS or the like) or the like.

Information relating to the MU participation frame transmission time limit may be information indicating a time period within which transmission of an MU participation frame can be performed (or a point at which transmission can be performed) by another terminal device 2-1, following an MU initiation frame or MU participation frame transmitted by a terminal device 2-1. For example, in a case where a certain terminal device 2-1 has transmitted an MU initiation frame or MU participation frame containing information relating to an MU participation frame transmission time limit, and this terminal device 2-1 does not receive an MU participation frame from a terminal device 2-1 other than itself within the time period within which transmission of an MU participation frame can be performed, indicated by the information relating to the MU participation frame transmission time limit, this terminal device 2-1 determines that there are no more terminal devices 2-1 participating on the UL-MU transmission, and can initiate the UL-MU transmission at a preset point in time, or initiate single user transmission. The terminal devices 2-1 suitably setting the MU participation frame transmission time limit enables UL-MU transmission with a low overhead to be realized.

Note that the MU participation frame transmission time limit may be set as the number of slots (slot), or may be set using an IFS. For example, a terminal device 2-1 can determine the method by which to process UL-MU transmission by whether or not an MU participation frame has been received within a DIFS period (alternatively, detection of the preamble of an MU participation frame will suffice).

Note that the back-off unit 10002b-1 can newly generate a back-off dedicated for UL-MU transmission (hereinafter also referred to as MU back-off). A method for generating an MU back-off will be described later.

An MU participation frame has a configuration including MU Information. The configuration of an MU participation frame may be the same as the configuration of an MU initiation frame, or may be a different configuration, for example. Note that MU Information may be included in the MAC header of the MU initiation frame and MU participation frame, may be included in the data portion, and may be included in L-SIG or HE-SIG in the PHY header.

A terminal device 2-1 can generate an MU participation frame that this terminal device 2-1 is to transmit, based on information that an MU initiation frame or MU participation frame received immediately prior contains. For example, the MU participation frame may include information relating to the index of the MU participation frame. Information relating to the index of the MU participation frame (MU index) preferably is information relating to which number in order this terminal device 2-1 has expressed intent to participate in the UL-MU (for example, at which number in order this terminal device 2-1 transmitted the MU participation frame). For example, in a case where the terminal device 2-1 uses multiple wireless resources, the MU index is preferably a value obtained by totaling the number of wireless resources which this terminal device 2-1 uses, and the MU indices contained in the MU initiation frame or MU participation frame received immediately prior.

For example, in a case where a terminal device 2-1 that has transmitted an MU participation frame subsequently receives an MU participation frame transmitted by a terminal device other than that terminal device 2-1, determination of UL-MU transmission initiation can be performed taking into consideration the MU index thereof and value indicated by the MU upper limit number information. For example, the MU index and the MU upper limit number matching can be used as a condition for UL-MU transmission initiation in the BSS 3-1. Although conditions for UL-MU transmission initiation are not restricted, the base station device 1-1 can perform notification of information relating to conditions for UL-MU transmission initiation. That is to say, it is preferable that participation of more terminal devices 2-1 than the MU upper limit number of the BSS 3-1 in the UL-MU transmission is not permitted. Alternatively, it is preferable that more spatial streams than the MU upper limit number of the BSS 3-1 is not permitted. It is preferable that an MU participation frame containing an MU index of a value greater than the information relating to the UL upper limit number is not permitted, and it is preferable that conditions are set to that end. Note that conditions for MU participation frame transmission permission are not restricted in the present embodiment.

In a case where a No. (indicator, index, individual value, reference value) is given to a wireless resource, MU initiation frames and MU participation frames preferably include information relating to the No. of the wireless resource. A terminal device 2-1 that has received an MU initiation frame or MU participation frame including information relating to the No. of the wireless resource used by the terminal device 2-1 can determine a wireless resource regarding which usage has already been decided, and can suitably perform UL-MU transmission by using a wireless resource other than this wireless resource regarding which usage has already been decided. For example, there are cases in UL-OFDMA where a frequency band is divided into sub-bands (smallest bandwidth used in data communication), and Nos. are given to each sub-band. Also, LTF generation methods (or transmission methods) can be indexed in UL-MU-MIMO, and an index indicating an LTF generation method can be deemed to be the index of the wireless resource.

The terminal devices 2-1 can also change the LTF generation method based on the MU index. This is realized in UL-MU transmission by the base station device 1-1 separating transmission frames from multiple terminal devices 2-1, and it is preferable that the base station device 1-1 knows beforehand the propagation channels (channel, Channel, wireless propagation channel, Radio Channel) between the terminal devices 2-1 participating in the UL-MU transmission and the base station device 1-1, for separation of the transmission frames. The base station device 1-1 estimates channels by LTFs attached to transmission frames transmitted by the terminal devices 2-1, but there may be cases in UL-MU-MIMO where LTFs are multiplexed as well. Accordingly, the terminal devices 2-1 participating in UL-MU-MIMO transmission preferably perform different encoding or scrambling for orthogonalization of LTFs in order for the base station device 1-1 to perform channel estimation suitably. A different LTF generation method for each MU index can be set in the BSS 3-1 beforehand, with the base station device 1-1 notifying the terminal devices 2-1 of information relating to the correlation between MU indices and LTF generation methods. The LTF generation method may be specification of cyclic shift amount.

The terminal devices 2-1 can change wireless resources for performing LTF transmission (e.g., time, frequency, etc.) (or can change the transmission method) based on the MU index. For example, the base station device 1-1 can suitably perform estimation of propagation channels as to the terminal devices 2-1 by the terminal devices 2-1 which perform UL-MU transmission performing LTF transmission using different wireless resources from each other, based on MU index.

Another example of a channel estimation method by the base station device 1-1 will be illustrated. The base station device 1-1 saves channel information estimated for the LTF included in each MU initiation frame and MU participation frame, which can be used for separating multiplexed transmission frames in the UL-MU transmission. In this case, suitable UL-MU transmission can be realized even in a case where the terminal devices 2-1 use the same LTF generation method. Even higher precision of channel estimation can be realized by the base station device 1-1 using channel estimation values obtained using LTFs included in UL initiation frames or UL participation frames, and channel estimation values obtained using LTFs included in UL-MU transmission frames. For example, the base station device 1-1 can improve channels estimation precision by averaging channel estimation values obtained using LTFs included in UL initiation frames or UL participation frames, and channel estimation values obtained using LTFs included in UL-MU transmission frames.

In the example illustrated in FIG. 4, the terminal device 2c-1 can skip step S105, and the terminal device 2a-1, terminal device 2b-1, and terminal device 2c-1 can initiate UL-MU transmission at the same time, for example.

Note that the back-off unit 10002b-1 can generate a CW used in a dedicated manner for UL-MU transmission. The terminal devices 2-1 generate a CW based on information relating to a CW generation method that the MU initiation frame and MU participation frame contain. A CW used in a dedicated manner for UL-MU transmission is referred to as an MUCW. The method of generating an MUCW is not restricted.

For example, an MU initiation frame or MU participation frame may include either or both of CWmin including information relating to the maximum value of the CW and CWmax including information relating to the minimum value of the CW, as the MUCW generation method. The back-off unit 10002b-1 can decide the range of the MUCW to be set based on either or both of CWmin and CWmax, acquire a random value, and set this to the MUCW. The method of the back-off unit 10002b-1 generating an MUCW is not restricted to this. The method of generating an MUCW preferably is a method that avoids simultaneous transmission of MU participation frames by multiple terminal devices 2-1 (collision, Collision).

Figure 6:
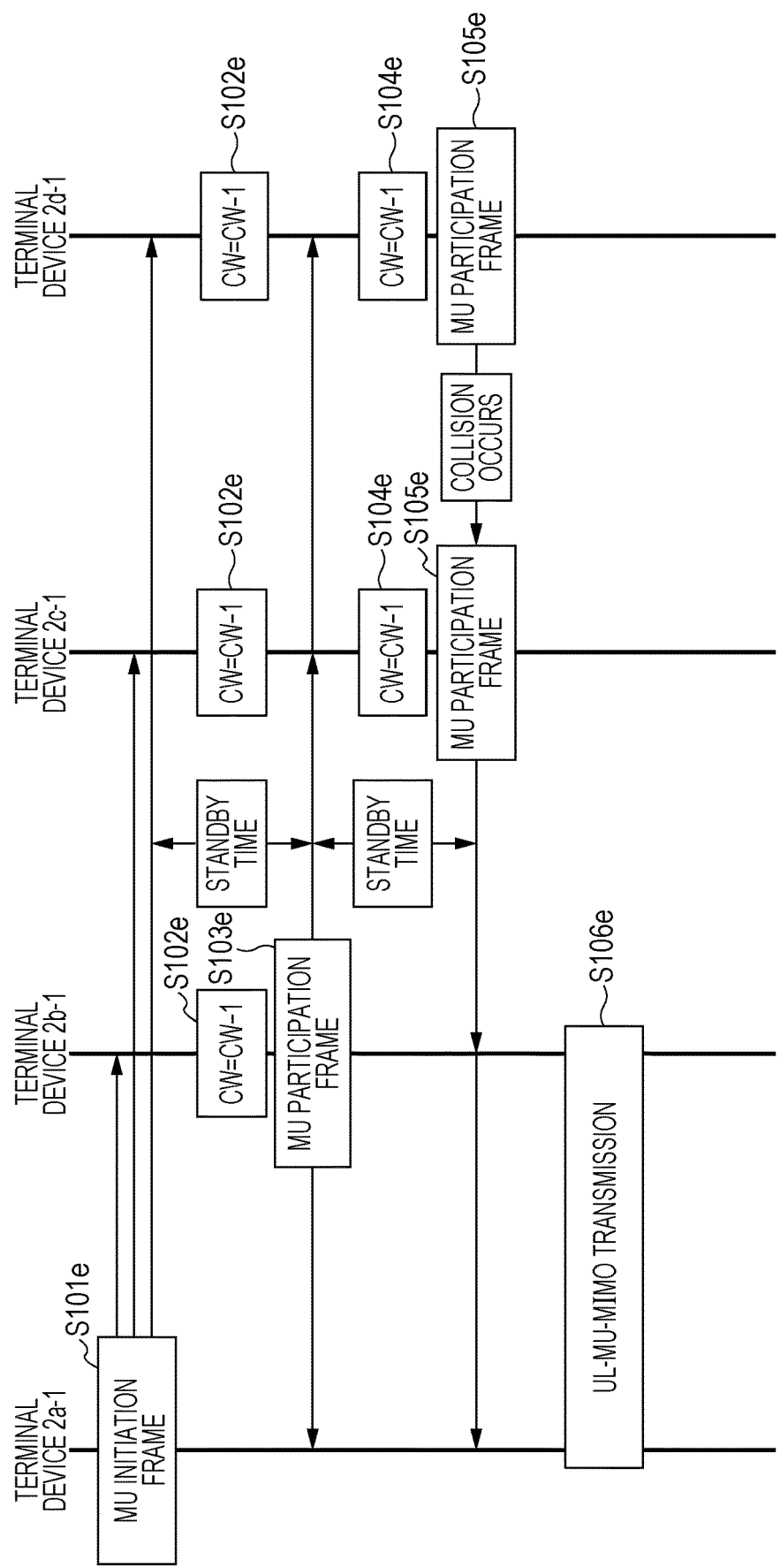
FIG. 6 is a sequence chart illustrating an example of procedures for UL-MU transmission according to the present invention.

FIG. 6 is a sequence chart illustrating another example of procedures for UL-MU transmission according to the first embodiment. The example illustrated in FIG. 6 illustrates processing in a case where transmissions of MU participation frames have collided. The procedures of processing illustrated in FIG. 6 is applicable to any MU upper limit number.

The terminal device 2a-1 transmits an MU initiation frame (step S101e). The back-off units 10002b-1 relating to the terminal device 2b-1, the terminal device 2c-1, and terminal device 2d-1, execute CW countdown (Step S102e). The terminal device 2-1 which has reached CW=0 (the terminal device 2b-1 in the example illustrated in FIG. 6) transmits an MU participation frame (step S103e). Subsequently, the back-off units 10002b-1 relating to the terminal device 2c-1 and terminal device 2d-1 that have received the MU participation frame execute CW countdown (Step S104e).

The terminal device 2c-1 and the terminal device 2d-1 initiate transmission of MU participation frames at the same time, so it is conceivable that the terminal device 2a-1 and terminal device 2b-1 cannot receive the MU participation frames. In a case where no MU participation frame is detected within the preset MU participation frame transmission time limit, UL-MU transmission can be performed after standing by for a predetermined amount of time. In the example illustrated in FIG. 6, the terminal device 2a-1 and terminal device 2b-1 initiate UL-MU transmission (step S106e).

Note that in a case where multiple terminal devices transmit an MU participation frame containing exactly the same information bits, it is assumed that the terminal devices 2-1 can receive the MU participation frame. In this case, the conditions for initiating UL-MU transmission can be changed (e.g., initiating UL-MU transmission in a case where the MU index is one smaller than the MU upper limit number, etc.), taking into consideration beforehand the possibility of MU participation frames colliding.

The example illustrated in FIG. 6 illustrates an example where the MU participation frames transmitted by the terminal device 2c-1 and terminal device 2d-1 collide, and accordingly the terminal device 2b-1 cannot receive the MU participation frames. The terminal device 2b-1 cannot receive the MU participation frames, in the same way as in a case where the terminal device 2c-1 and terminal device 2d-1 do not transmit MU participation frames, so UL-MU transmission can be performed after standing by for a predetermined amount of time. In the same way, in a case where the terminal device 2a-1 receives an MU participation frame transmitted by the terminal device 2b-1, but thereafter does not receive an MU participation frame, UL-MU transmission can be performed after standing by for a predetermined amount of time, in the same way as with the terminal device 2b-1.

Figure 7:
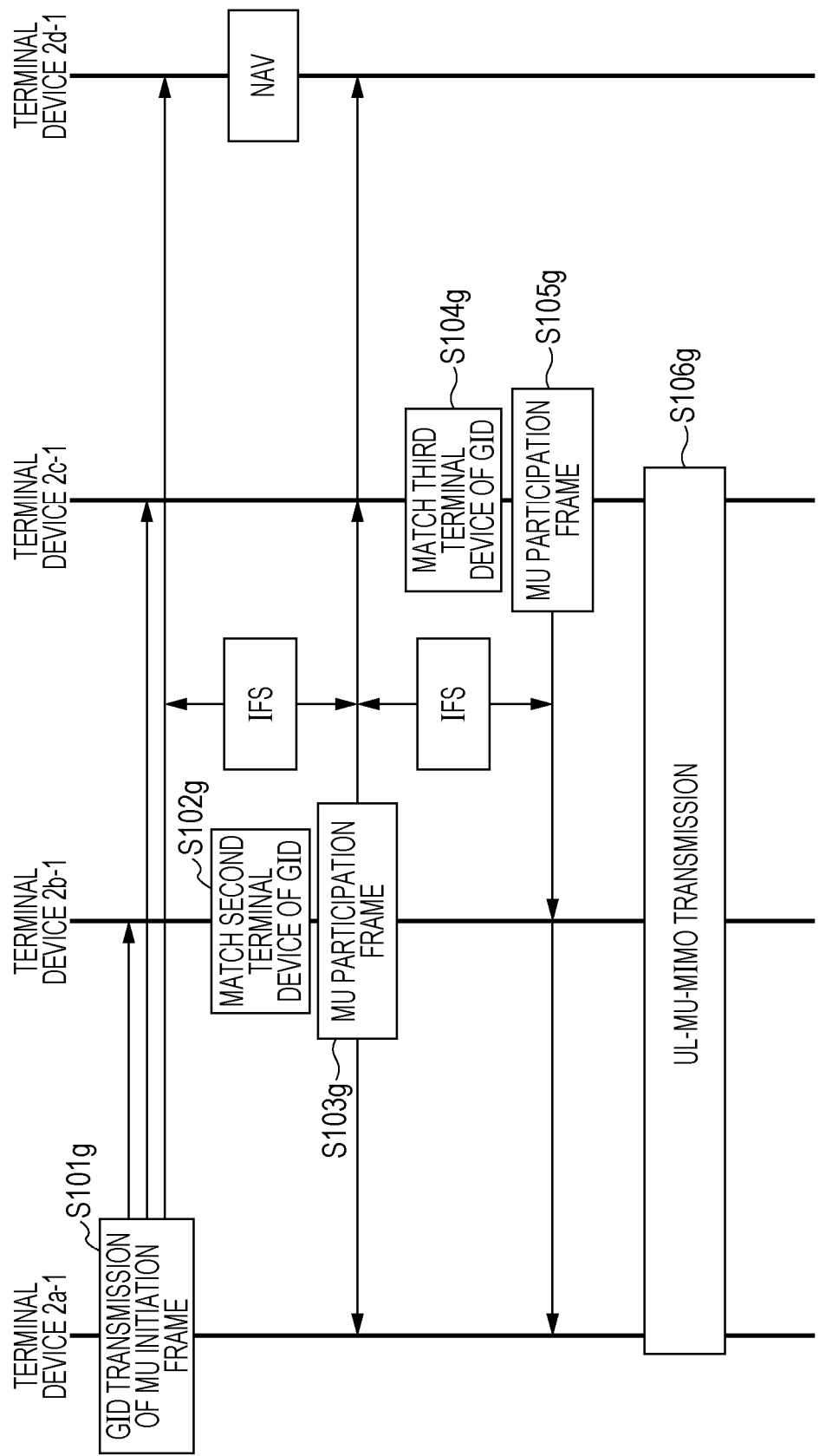
FIG. 7 is a sequence chart illustrating an example of procedures for UL-MU transmission according to the present invention.

FIG. 7 is a sequence chart illustrating another example of procedures for UL-MU according to the first embodiment. Note that the example illustrated in FIG. 7 is applicable at any MU upper limit number.

The terminal device 2a-1 transmits an MU initiation frame (step S101g). The MU initiation frame in step S101g includes information relating to the group of terminal devices 2-1. Information relating to the group may be a GID, for example, or may be sub-group information (e.g., information indicating a partial set of the entirety of terminal devices 2-1 participating in the BSS 3-1). Note that description will be made regarding the example illustrated in FIG. 7 with the MU upper limit number being 3.

FIG. 8 is a diagram illustrating an example of a GID configuration. A GID is a configuration where information relating to addresses indicating the terminal devices 2-1 has been stored in respective blocks. In the example illustrated in FIG. 8, a group of terminal devices is allocated to each GID (Group ID). For example, GID1 includes information relating to the addresses of STA2, STA3, STA4, and STA5. A GID indicates information relating to the order of addresses of terminal devices. Alternatively, a GID has a configuration where the order of terminal devices is understood. For example, GID1 and GID2 are made up of the same terminal devices, but the order of the terminal device configuration is different. Hereinafter, the expression n'th terminal device will be used to distinguish the order in the GID configuration. For example, in GID31 the 1st terminal device is STA6, the 2nd terminal device is STA2, the 3rd terminal device is STA4, and the 4th terminal device is STA8.

In the example illustrated in FIG. 7, the terminal device 2a-1 has transmitted an MU initiation frame including a GID where the first terminal device is the terminal device 2a-1, the second terminal device is the terminal device 2b-1, the third terminal device is the terminal device 2c-1, and the fourth terminal device is the terminal device 2d-1.

Of the terminal devices 2-1 receiving the MU participation frame including the GID, the terminal device 2b-1 that is the second terminal device in this GID stands by for transmission for a predetermined period (e.g., IFS or the like) after having received the MU initiation frame (step S102g), and then transmits a MU participation frame (step S103g).

Next, the terminal device 2c-1 that is the third terminal device in the GID stands by for transmission for a predetermined period (e.g., IFS or the like) after having received the MU participation frame (step S104g), and then transmits a MU participation frame (step S105g).

The MU upper limit number is three, so after step S105g has been completed, the terminal device 2a-1, terminal device 2b-1, and terminal device 2c-1 stand by for a predetermined period (e.g., IFS or the like), and then initiate UL-MU transmission.

On the other hand, the terminal device 2d-1 does not participate in this UL-MU transmission, and accordingly the NAV can be set after receiving the MU initiation frame.

The terminal devices 2-1 that have received the MU initiation frame including sub-group information reference the sub-group information, and in a case where sub-group information including these terminal devices 2-1 is detected, MU participation frames can be transmitted, and the backoff units 10002b-1 can perform CW generation and CW countdown.

Next, a method for protection from a legacy terminal device will be described. The terminal device 2a-1 can protect the UL-MU transmission by transmitting an RTS frame or CTS frame before transmitting the MU initiation frame. In this case, the information in the Duration field included in the RTS frame or CTS frame can be set to the UL-MU transmission procedure ending point-in-time. The UL-MU transmission procedure ending point-in-time may be the ending point-in-time of UL-MU transmission by the terminal devices 2-1, or may be an ending point-in-time of ACK transmission of the base station device 1-1 after the UL-MU transmission by the terminal devices 2-1.

The base station device 1-1 may transmit an RTS frame or a CTS frame after the terminal device 2a-1 has transmitted the MU participation frame, in order to reduce the hidden node problem with regard to the terminal device 2a-1. Thus, effects equivalent to RTS/CTS exchange can be anticipated.

Further, the base station device 1-1 may transmit a resource securing frame, of which the RTS frame is representative, to the terminal devices 2-1 which have a possibility of participating in the UL-MU transmission. For example, the base station device 1-1 can transmit a resource securing frame including information specifying a certain GID. Of the terminal devices 2-1 that have received this resource securing frame, the terminal device 2-1 which is the first in order in this GID may become the Initiator.

As described above, suitable UL-MU transmission can be realized by applying the present embodiment to a wireless network. Improvement in frequency efficiency is realized while easily realizing a wireless network configuration.

2. Second Embodiment

Figure 9:
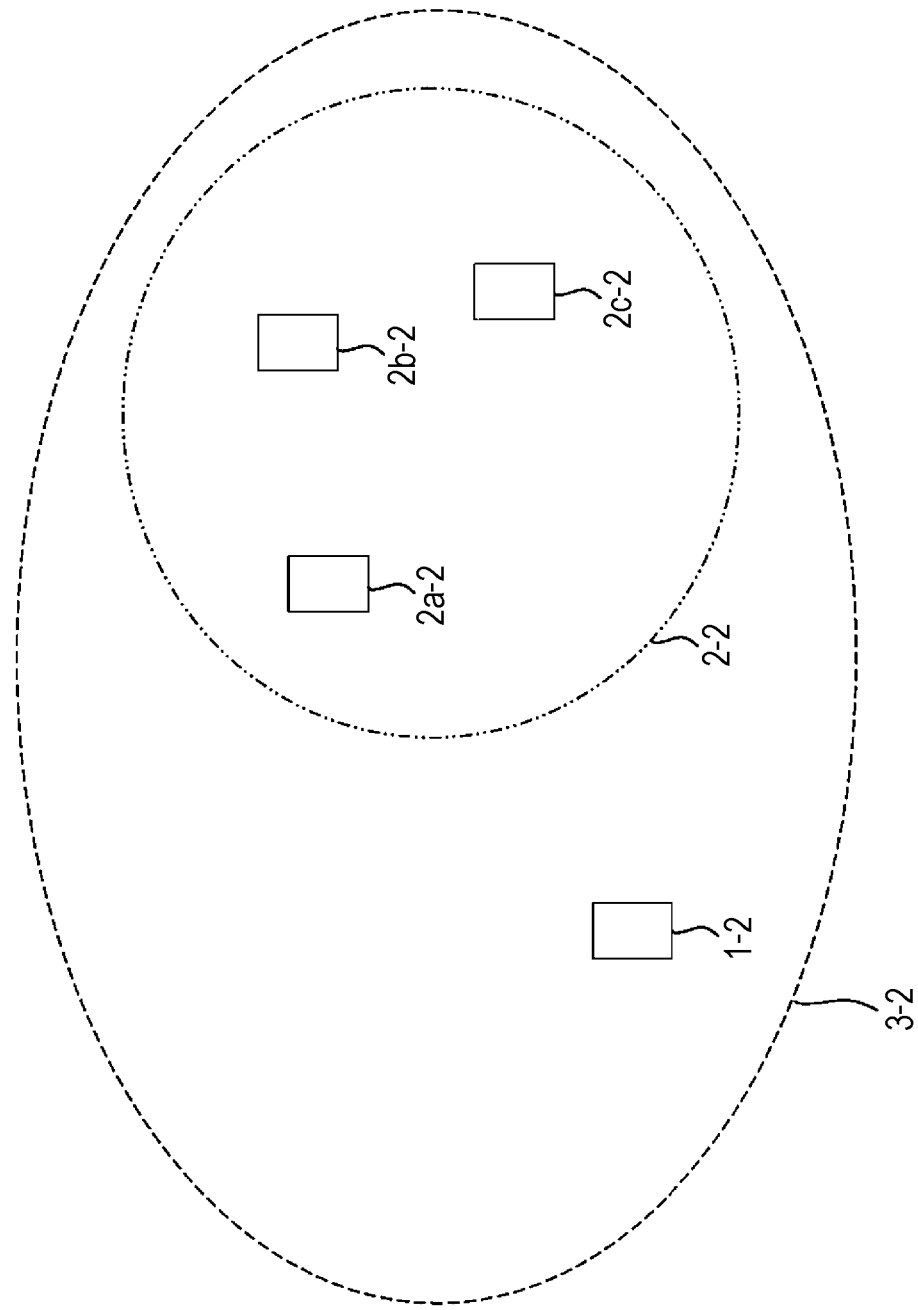
FIG. 9 is a diagram illustrating an example of the configuration of the wireless communication system according to the present invention.

FIG. 9 is a diagram illustrating an example of the configuration of a wireless communication system according to the present embodiment. The terminal device 1-2 and terminal device 2a-2, terminal device 2b-2, and terminal device 2c-2 (hereinafter also collectively referred to as terminal devices 2-2) make up a BSS 3-2. Note that the terminal device 1-2 may have the same device configuration as the terminal devices 2-2, or may be a different device or a configuration including different functions. For example, the terminal device 1-2 can manage the functions of the BSS 3-2 (e.g., functions of deciding resources used for communication, scheduling, and so forth). For example, the terminal device 1-2 may be a device configuration of the BSS 3-2.

The terminal device 1-2 can transmit control information (beacons, annunciation information, annunciation signals, signaling information) to the terminal devices 2-2.

The terminal device 1-2 and terminal devices 2-2 have functions of performing temporal synchronization. The method of temporal synchronization is not restricted.

Figure 10:
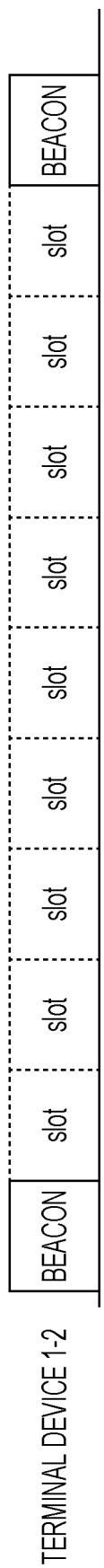
FIG. 10 is a diagram illustrating an example of a temporal synchronization method according to the present invention.

FIG. 10 is a diagram illustrating an example of a temporal synchronization method. The terminal device 1-2 transmits beacons at set intervals. A wireless resource (e.g., time) between this transmitted beacon and the next beacon to be transmitted with the set interval therebetween has a configuration of containing multiple sections (slot, slots) at preset intervals. In the example illustrated in FIG. 10, the slots are at equal intervals, but the configuration method of slots is not restricted. The method according to the present embodiment can be carried out as long as the terminal device 1-2 and terminal devices 2-2 share information relating to a common configuration method of slots.

For example, by the terminal device 1-2 and terminal devices 2-2 being set so that transmission of signal is started only at the start point-in-time of the slots, temporal synchronization can be easily realized simply by the terminal devices 2-2 monitoring the beacons from the terminal device 1-2.

Also, in a different method, the terminal device 1-2 and the terminal devices 2-2 can be set to perform different operations at each of the slots. For example, settings can be made such that a different terminal device 1-2 or terminal device 2-2 is permitted to perform operations (e.g., transmission processing, back-off processing, etc.) at each slot. Further, settings may be made such that only certain terminal devices can communicate with each other in each of the slots.

Figure 11:
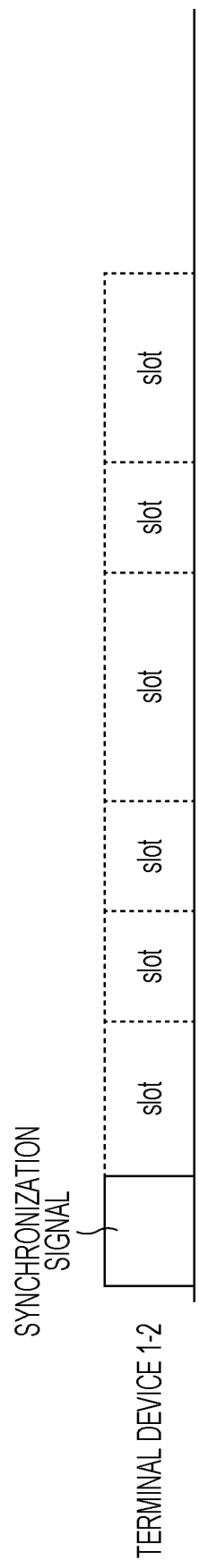
FIG. 11 is a diagram illustrating another example of the temporal synchronization method according to the present invention.

The temporal synchronization method according to the present embodiment can perform temporal synchronization using synchronization signals that the terminal device 1-2 transmits non-periodically. FIG. 11 is a diagram illustrating another example of a temporal synchronization method. The terminal device 1-2 transmits synchronization signals non-periodically. The terminal device 1-2 and the terminal devices 2-2 share information beforehand relating to timings at which transmission can be performed after reception of a synchronization signal (slot configuration method in the example illustrated in FIG. 11). Settings can be made such that transmission of signals is started only at the starting point of each slot. Note that information relating to timings at which transmission can be performed will also be referred to as information relating to slot configuration hereinafter.

Note that the terminal device 1-2 and terminal devices 2-2 may be set to initiate transmission at a point after standing by for a preset amount of time after the start point of each slot. The standby time is preferably shared between the terminal device 1-2 and terminal devices 2-2.

Figure 12:
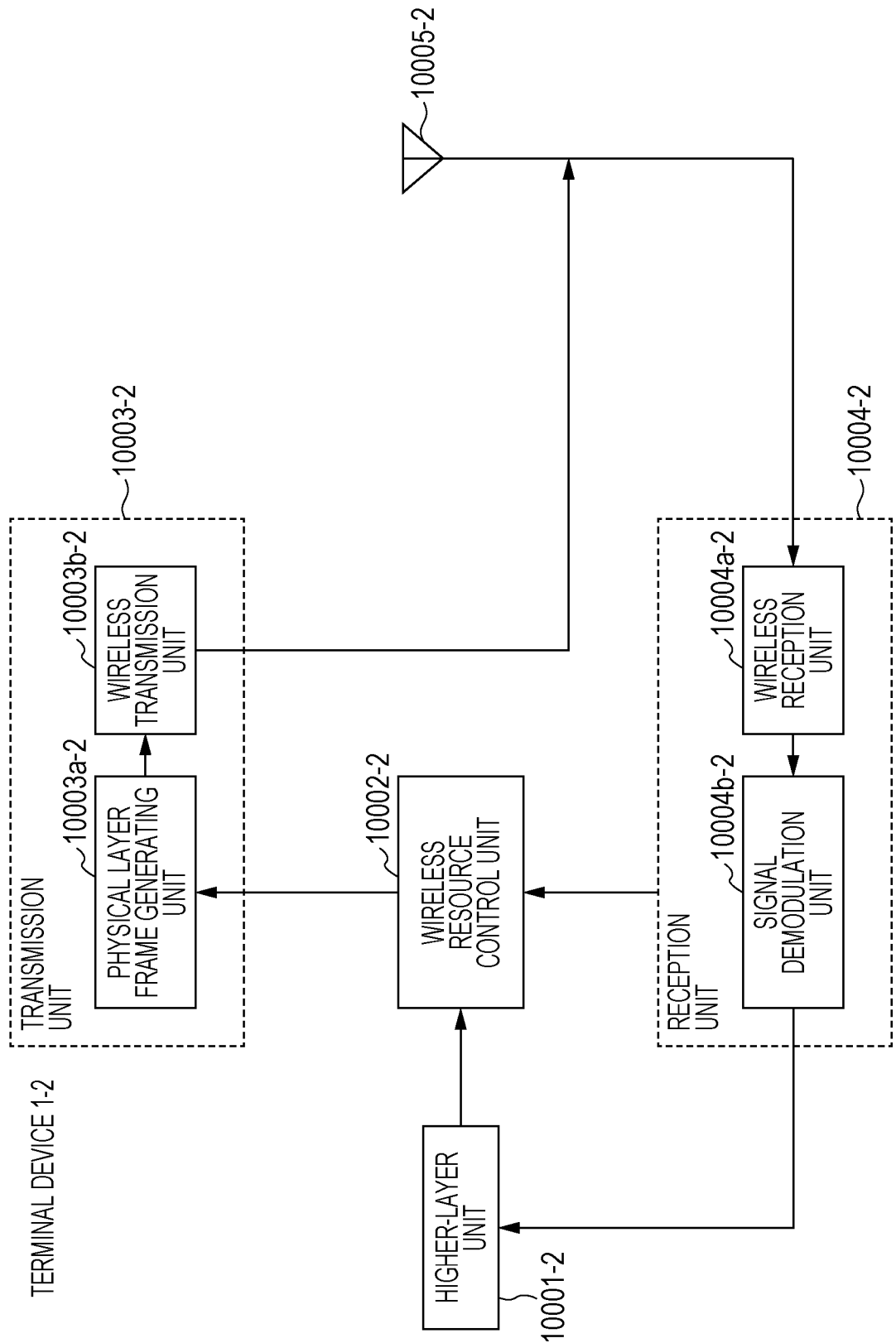
FIG. 12 is a diagram illustrating an example of the device configuration of a terminal device according to the present invention.

FIG. 12 is a diagram illustrating an example of the device configuration of the terminal device 1-2. The terminal device 1-2 has a configuration including a higher-layer unit 10001-2, a wireless resource control unit 10002-2, a transmission unit 10003-2, a reception unit 10004-2, and an antenna unit 10005-2.

The higher-layer unit 10001-2 has the same functions as those of the higher-layer unit 10001-1, so description will be omitted.

The wireless resource control unit 10002-2 has functions of performing control of wireless resources that the terminal device 1-2 uses when transmitting signals. The wireless resource control unit 10002-2 can perform either or both of control of wireless resources used by the terminal device 1-2 and control of wireless resources used by the terminal devices 2-2. For example, in order to control of wireless resources used by the terminal devices 2-2, information relating to wireless resources used by the terminal devices 2-2 is preferably transmitted toward the terminal devices 2-2.

Note that the control method of wireless resources that the wireless resource control unit 10002-2 performs is not restricted. For example, the wireless resource control unit 10002-2 can randomly decide a transmission initiation point-in-time, or may determine based on information relating to a reception signal notified from the reception unit 10004-2. For example, a method of initiating transmission, where transmission is initiated if an interference measurement value of wireless resources immediately prior to a scheduled transmission initiation point-in-time is lower than a threshold value, can be used. Also, an arrangement may be made where, based on the type of reception signal (frame type, information relating to frame configuration, information that a frame contains), standby of transmission is performed only in a case where a signal of a particular reception signal type is received. The wireless resource control unit 10002-2 may have a device configuration the same as the autonomous decentralized control unit 10002-1.

The transmission unit 10003-2 is configured including a physical layer frame generating unit 10003a-2 and a wireless transmission unit 10003b-2. The physical layer frame generating unit 10003a-2 has a function of generating physical layer frames based on wireless resource information set by the wireless resource control unit 10002-2. The physical layer frame generating unit 10003a-2 subjects physical layer frames to error-correction encoding, modulation, prerecording filter multiplication, and so forth. The physical layer frame generating unit 10003a-2 notifies the wireless transmission unit 10003b-2 of the generated physical layer frames.

The wireless transmission unit 10003b-2 has the same functions as the wireless transmission unit 10003b-1, so description will be omitted.

The reception unit 10004-1 is a configuration including a wireless reception unit 10004a-2 and a signal demodulation unit 10004b-2. The reception unit 10004-2 generates information relating to reception signal power, from RF band signals that the antenna unit 10005-2 receives. The reception unit 10004-2 can notify the wireless resource control unit 10002-2 of information relating to reception signal power and information relating to reception signals.

The wireless reception unit 10004a-2 has the same functions as the wireless reception unit 10004a-1, so description will be omitted.

The signal demodulation unit 10004b-2 has the same functions as the signal demodulation unit 10004b-1, so description will be omitted.

The antenna unit 10005-2 has the same functions as the antenna unit 10005-1, so description will be omitted.

Figure 13:
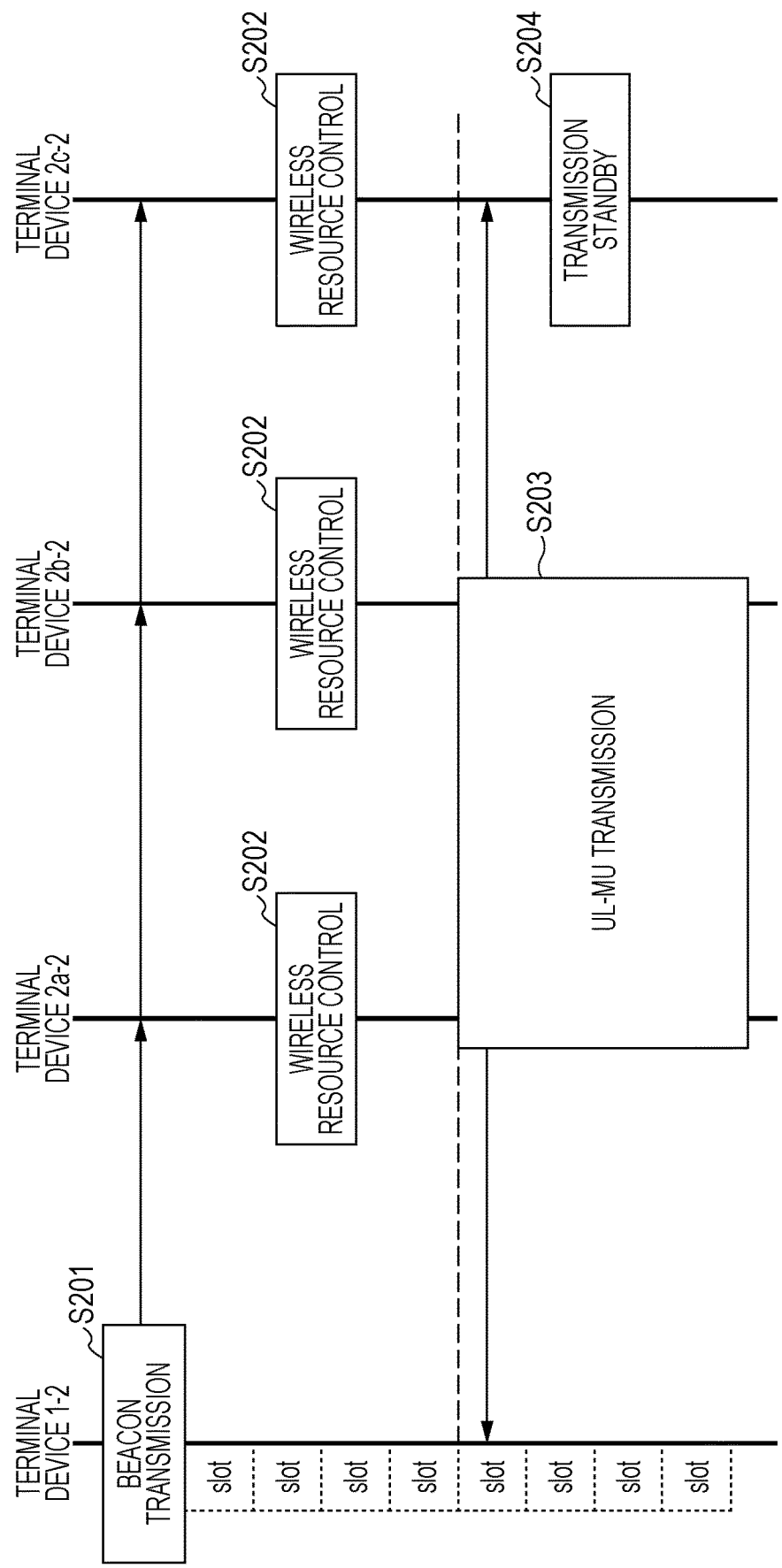
FIG. 13 is a sequence chart illustrating an example of procedures for UL-MU transmission according to the present invention.

FIG. 13 is a sequence chart illustrating an example of UL-MU transmission procedures according to the second embodiment. Note that the example illustrated in FIG. 13 is applicable to any MU upper limit number.

In the example illustrated in FIG. 13, the terminal device 1-2 transmits beacons toward the terminal devices 2-2 (step S201). The terminal devices 2-2 use information relating to slot configuration from the point-in-time of beacon reception, to perform their respective wireless resource control (step S202).

The terminal device 2a-2 and the terminal device 2b-2 initiate transmission at the same timing in the example illustrated in FIG. 13. The terminal device 2a-2 and terminal device 2b-2 are assumed to have easily achieved temporal synchronization using the reception point-in-time of the beacon transmitted from the terminal device 1-2 and information relating to slot configuration. Accordingly, the terminal device 2a-2 and terminal device 2b-2 initiate transmission at the same point in time (step S203).

Note that step S203 is observed by the terminal device 1-2 and terminal device 2c-2 as being UL-MU transmission.

In response to step S203, the terminal device 2c-2 performs transmission standby (step S204).

In the example illustrated in FIG. 13, autonomous decentralized UL-MU transmission by the terminal devices 2-2 is realized using beacons or synchronization signals transmitted by the terminal device in step S201. In other words, the wireless communication system according to the present embodiment can be a system that realizes UL-MU transmission without using signals signaled for UL-MU transmission initiation.

In a case where the terminal device 1-2 transmits a UL-MU transmission frame, the terminal device 2a-2 and terminal device 2b-2 preferably transmit reference signals for channel estimation toward the terminal device 1-2, each using orthogonal resources. The terminal devices 2-2 can have multiple generation methods for reference signals for channel estimation prepared (generation methods set so as to each use orthogonal resources), and use these randomly, thereby orthogonalizing reference signals for channel estimation.

Although the possibility of the reference signals for channel estimation colliding (the same resource being used) remains, due to randomly generating reference signals for channel estimation, the probability of collision can be reduced.

Figure 14:
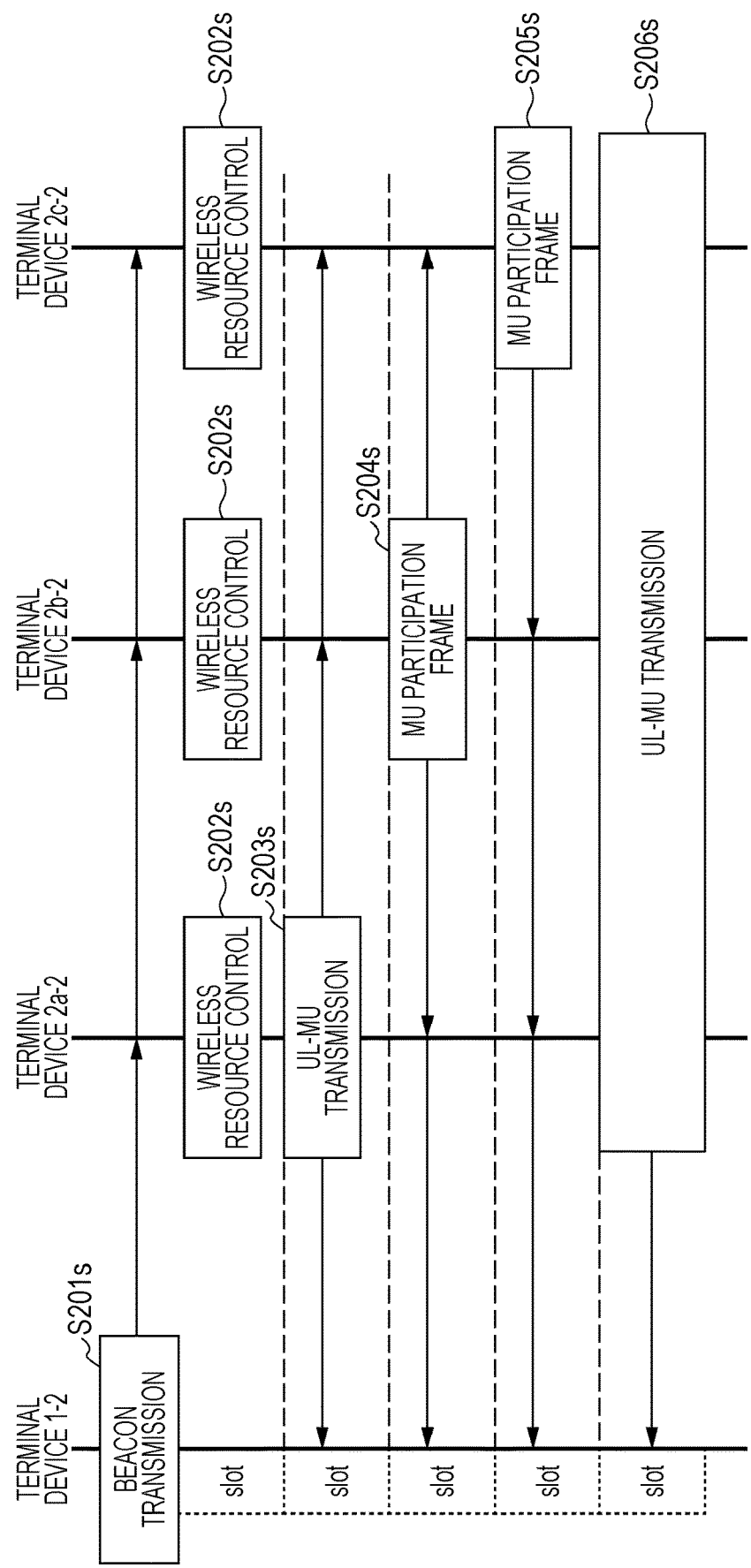
FIG. 14 is a sequence chart illustrating an example of procedures for UL-MU transmission according to the present invention.

FIG. 14 is a sequence chart illustrating a different example of UL-MU transmission procedures in the communication system according to the present embodiment. Note that the example illustrated in FIG. 14 can be performed at any MU upper limit number.

First, the terminal device 1-2 transmits a beacon (step S201s). The terminal devices 2-2 receive the beacon, and each perform wireless resource control (step S202s).

As a result of step S202s, the terminal device 2a-2 performs transmission of an MU initiation frame at the second slot in the example illustrated in FIG. 14 (step S203s). The terminal device 2b-2 and terminal device 2c-2 extract the MU Information contained in the received MU initiation frame, and perform wireless resource control from the MU Information and the results of step S202s.

Next, the terminal device 2b-2 transmits a MU participation frame at the third slot from the beginning (step S204s). In the same way, the fourth terminal device 2c-2 transmits a MU participation frame (step S205s).

At the fifth slot from the beginning, the terminal devices 2-2 initiate UL-MU transmission (step S206s).

The terminal device 1-2 and terminal devices 2-2 share information relating to preset transmission point candidates (e.g., the start of each slot in the example illustrated in FIG. 14) beforehand, so MU participation frame procedures can be made easy.

For example, an MU initiation frame that does not contain information relating to MU participation frame transmission time limit can be transmitted. In this case, in a case where the terminal device 2a-2 has transmitted an MU initiation frame at the second slot from the beginning for example, if no MU participation frame is successfully received at the third slot from the beginning, determination can be made that there are no more terminal devices 2-2 that will participate in the UL-MU transmission. For example, in a case where a terminal device 2-2 that has transmitted an MU initiation frame or an MU participation frame in a certain slot (first slot), and no MU participation frame is successfully received in the next slot (second slot), UL-MU transmission or single user (SU: Single User) transmission can be performed in a subsequent slot (third slot). Note that intervals between the first slot, the second slot, and the third slot, are not restricted.

Also, there is no need to constantly perform reception operations since transmission point candidates are set beforehand, so power consumption reduction effects can be expected.

Also, MU initiation frames and MU participation frames can have temporal synchronization functions. For example, the terminal device 1-2 and terminal devices 2-2 can share information relating to slot configuration from the reception point of an MU initiation frame. In this case, UL-MU transmission procedures can be carried out based on the slot configuration from the reception point of the MU initiation frame or MU participation frame.

As described above, suitable UL-MU transmission can be realized by applying the present embodiment to a wireless network. Improvement in frequency efficiency is realized while easily realizing a wireless network configuration.

3. Common to all Embodiments

A program running on the base station device 1-1, terminal devices 2-1, terminal devices 1-2, and terminal devices 2-2, according to the present invention, is a program that controls a CPU or the like (a program that causes a computer to function) so as to realize the functions of the above-described embodiments according to the present invention. Information handled by these devices is temporarily stored in RAM at the time of processing, thereafter is stored in various types of ROM or HDDs, read out by the CPU as necessary, and modification/wiring is performed. A recording medium storing the program may be any of semiconductor media (e.g., ROM, nonvolatile memory card, etc.), optical recording media (e.g., DVD, MO, MD, CD, BD, etc.), magnetic recording media (e.g., magnetic tape, flexible disk, etc.), and so forth. There also are cases where the functions of the above-described embodiments are realized not only by the loaded program being executed, but also where the functions of the present invention are realized by processing being performed collaboratively with an operating system, another application program, or the like, based on instruction of the program.

In a case of distributing to the market, the program may be stored in a portable recording medium and distributed, or may be transferred to a server computer connected via a network such as the Internet. In this case, a storage device in the server computer is included in the present invention.

Part or all of the above-described base station device 1-1, terminal devices 2-1, terminal devices 1-2, and terminal devices 2-2, according to the above-described embodiments, may typically be realized as an LSI that is an integrated circuit. The function blocks of the base station device 1-1, terminal devices 2-1, terminal devices 1-2, and terminal devices 2-2 may be formed as individual chips, or part or all may be formed as an integrated chip. In a case where the function blocks are formed as an integrated circuit, an integrated circuit control unit for control thereof is added.

Techniques for forming an integrated circuit are not restricted to LSIs, and may be realized by dedicated circuits or general-purpose processors. In the event of the advent of an integrated circuit technology which would replace LSIs by advance of semiconductor technology, integrated circuits according to such a technology may be used.

Note that the present invention is not restricted to the above-described embodiments. The base station device 1-1, terminal devices 2-1, terminal devices 1-2, and terminal devices 2-2, according to the present invention, are not restricted to application to mobile station devices, and it is needless to say that this may be applied to fixed or non-portable electronic equipment installed outdoors or indoors, such as, for example, AV equipment, kitchen equipment, cleaning/laundry equipment, air conditioning equipment, office equipment, vending equipment, other daily-use equipment, and so forth.

Although embodiments of the present invention have been described in detail with reference to the drawings, specific configurations are not restricted to these embodiments, and designs and so forth that do not depart for the essence of this invention are also included in the scope of the Claims.

INDUSTRIAL APPLICABILITY

The present invention is suitable for use in a terminal device, communication method, and communication system.

The present application claims priority based on Japanese Patent Application No. 2015-084603 filed on Apr. 17, 2015, and the entirety of Japanese Patent Application No. 2015-084603 is incorporated in the present international application.

REFERENCE SIGNS LIST 1-1 base station device
2-1, 1-2, 2-2 terminal device
3-1, 3-2 management range
10001-1, 10001-2 higher-layer unit
10002-1 autonomous decentralized control unit
10002-2 wireless resource control unit
10002a-1 CCA unit
10002b-1 back-off unit
10002c-1 transmission determination unit
10003-1, 10003-2 transmission unit
10003a-1, 10003a-2 physical layer frame generating unit
10003b-1, 10003b-2 wireless transmission unit
10004-1, 10004-2 reception unit
10004a-1, 10004a-2 wireless reception unit
10004b-1, 10004b-2 signal demodulation unit
10005-1, 10005-2 antenna unit

The invention claimed is:

1. A first terminal device that transmits a frame, the first terminal device comprising:
   a transmission unit that performs transmission of the frame using uplink OFDMA transmission based on a first back-off, and
   a reception unit that receives a control signal which triggers the uplink OFDMA transmission,
   wherein the control signal includes information indication a first subband that is available for the uplink OFDMA transmission and a second subband that is not available for the uplink OFDMA transmission,
   the first subband is divided into a plurality of subband,
   the first back-off is a value on which countdown is performed in case where the reception unit receives the control signal, and
   the transmission unit transmits the frame using any subband among the first subband based on the information included in the control signal and indicate divided the plurality of subband, in a case where the first back-off value has become 0.

2. The first terminal device according to claim 1,
   wherein the transmission unit performs transmission of the frame using uplink single user transmission based on a second back-off, and
   the second back-off is a value on which countdown is performed in a case where carrier sensing is performed only for a predetermined period of time and when the first terminal device determines it possible to transmit the frame.

3. The first terminal device according to claim 1,
   wherein the frame includes LTF, and
   wherein the control signal includes information relating to a generation method of the LTF in a case where the uplink OFDMA transmission is used.

4. The first terminal device according to claim 3,
   wherein the generation method of the LTF includes a method for applying orthogonal codes to the LTF.

5. The first terminal device according to claim 1,
   wherein the transmission unit performs countdown on the first back-off value based on information relating to a countdown method for the first back-off value, the information included in the control signal.

6. A communication method for a first terminal device that transmits a frame, the communication method comprising:
   performing transmission of the frame using uplink OFDMA transmission based on a first back-off, and
   receiving a control signal that triggers the uplink OFDMA transmission,
   wherein the control signal includes information indication a first subband that is available for the uplink OFDMA transmission and a second subband that is not available for the uplink OFDMA transmission,
   the first subband is divided into a plurality of subband,
   the first back-off is a value on which countdown is performed in case where the reception unit receives the control signal, and
   the transmission unit transmits the frame using any subband among the first subband based on the information included in the control signal and divided the plurality of subband, in a case where the first back-off value has become 0.

* * * * *

UNITED STATES PATENT AND TRADEMARK OFFICE
CERTIFICATE OF CORRECTION

| | |
|---|---|
| PATENT NO. | : 11,246,158 B2 |
| APPLICATION NO. | : 16/572259 |
| DATED | : February 8, 2022 |
| INVENTOR(S) | : Tomoki Yoshimura et al. |

It is certified that error appears in the above-identified patent and that said Letters Patent is hereby corrected as shown below:

In the Claims

In Column 24, Line 9, replace "indication" with --indicating--;

In Column 24, Line 13, replace "subband" with --subbands--;

In Column 24, Line 19, delete "indicate divided";

In Column 24, Line 20, replace "subband" with --subbands--;

In Column 24, Line 29, replace "determines it possible" with --determines that it is possible--;

In Column 24, Line 50, replace "indication" with --indicating--;

In Column 24, Line 54, replace "subband" with --subbands--;

In Column 24, Line 60, delete "divided"; and

In Column 24, Line 61, replace "subband" with --subbands--.

Signed and Sealed this
Second Day of September, 2025

Coke Morgan Stewart
*Acting Director of the United States Patent and Trademark Office*